US009320032B2

(12) United States Patent
Gaal et al.

(10) Patent No.: US 9,320,032 B2
(45) Date of Patent: Apr. 19, 2016

(54) ENB PDCCH IMPLEMENTATION TO AVOID AMBIGUOUS DCI INFORMATION

(71) Applicant: QUALCOMM Incorporated, San Diego, CA (US)

(72) Inventors: Peter Gaal, San Diego, CA (US); Mariam Motamed, Redwood City, CA (US); Wanshi Chen, San Diego, CA (US); Alexei Y. Gorokhov, San Diego, CA (US); Dominique F. Bressanelli, Hessen (DE); Levent Aydin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 14/023,438

(22) Filed: Sep. 10, 2013

(65) Prior Publication Data
US 2014/0185541 A1 Jul. 3, 2014

Related U.S. Application Data

(60) Provisional application No. 61/748,731, filed on Jan. 3, 2013, provisional application No. 61/753,900, filed on Jan. 17, 2013.

(51) Int. Cl.
*H04W 72/04* (2009.01)
*H04L 5/00* (2006.01)
*H04L 1/18* (2006.01)

(52) U.S. Cl.
CPC ........... *H04W 72/042* (2013.01); *H04L 5/0053* (2013.01); *H04L 1/1867* (2013.01)

(58) Field of Classification Search
None
See application file for complete search history.

(56) References Cited

U.S. PATENT DOCUMENTS 8,014,769 B2  9/2011  Lee et al.
8,867,519 B2 * 10/2014  Kim et al. ................. 370/349
(Continued)

FOREIGN PATENT DOCUMENTS

EP  2544482 A1  1/2013
EP  2557710 A2  2/2013
(Continued)

OTHER PUBLICATIONS

Love R., et al., "Downlink Control Channel Design for 3GPP LTE", Wireless Communications and Networking Conference, 2008, WCNC 2008, IEEE, Piscataway, NJ, USA, Mar. 31, 2008, pp. 813-818, XP031243734, ISBN: 978-1-4244-1997-5.
(Continued)

*Primary Examiner* — Timothy J Weidner
(74) *Attorney, Agent, or Firm* — Arent Fox LLP

(57) ABSTRACT

A method, an apparatus, and a computer program product for wireless communication are provided. The apparatus determines a first starting index for transmitting first control information in a first search space, determines a second starting index for transmitting second control information in a second search space, and transmits the second control information in the second search space at the second starting index when the first starting index and the second starting index are not the same value. The apparatus further transmits to a user equipment (UE) control information in a first search space, receives information from the UE corresponding to the transmitted control information, and decodes the received information based on the UE parsing the control information according to the first search space and based on the UE incorrectly parsing the control information according to a second search space.

20 Claims, 21 Drawing Sheets

(56) References Cited

U.S. PATENT DOCUMENTS

| | | | |
|---|---|---|---|
| 2010/0302983 | A1 | 12/2010 | McBeath et al. |
| 2011/0070845 | A1* | 3/2011 | Chen et al. ............... 455/91 |
| 2011/0269492 | A1 | 11/2011 | Wang |
| 2012/0009923 | A1* | 1/2012 | Chen et al. ............... 455/434 |
| 2012/0113869 | A1* | 5/2012 | Gaal et al. ............... 370/255 |
| 2012/0155316 | A1* | 6/2012 | Li et al. ............... 370/252 |
| 2012/0327783 | A1* | 12/2012 | Moon et al. ............... 370/241 |
| 2012/0327917 | A1 | 12/2012 | Yang et al. |
| 2013/0028219 | A1 | 1/2013 | Lee et al. |
| 2013/0070690 | A1* | 3/2013 | Moon et al. ............... 370/329 |
| 2013/0242906 | A1 | 9/2013 | Li et al. |
| 2014/0185540 | A1 | 7/2014 | Gaal et al. |

FOREIGN PATENT DOCUMENTS

| | | |
|---|---|---|
| EP | 2582074 A2 | 4/2013 |
| KR | 20110134305 A | 12/2011 |
| WO | 2011065703 A2 | 6/2011 |
| WO | 2011076241 A1 | 6/2011 |
| WO | 2011108673 A1 | 9/2011 |
| WO | 2011126329 A2 | 10/2011 |
| WO | 2013148120 | 10/2013 |

OTHER PUBLICATIONS

Asustek : "CSI reporting and resource size considering activation status", 3GPP Draft; R1-110962 CSI Reporting Condiering Activation Status, 3rd Generation Partnership Project (3GPP), Mobile Competence Centre, vol. RAN WG1, Feb. 15, 2011,XP050599155.
International Search Report and Written Opinion—PCT/US2014/010233—ISA/EPO—Jul. 8, 2014.
LG Electronics : "Issue on handling of search space collision in case of cross-carrier scheduling", 3GPP Draft; R1-102411 LTEA_PDCCH SS Handling, 3rd Generation Partnership Project (3GPP), Mobile Competence Centre, vol. RAN WG1, Apr. 6, 2010, XP050419625.
LG Electronics: "On the Necessity of Common Search Space on E-PDCCH", 3GPP Draft; R1-121454 EPDCCH CSS, 3rd Generation Partnership Project (3GPP), Mobile Competence Centre, vol. RAN WG1, Mar. 20, 2012, XP050599736, p. 3-4, Sophia-Antipolis Cedex; France [retrieved on Mar. 20, 2012].
QUALCOMM Incorporated: "Applicability of muting to certain messages",3GPP Draft; R1-106353 Applicability of Muting, 3rd Generation Partnership Project (3GPP), Mobile Competence Centre, vol. RAN WG1, Nov. 9, 2010, pp. 1-4, XP050489731.
Samsung: "Confusion between DCI Formats for Different CCs, Tx Modes and Bandwidths", 3GPP Draft; R1-102997 Confusion Between DCI Formats Final, 3rd Generation Partnership-Project (3GPP), Mobile Competence Centre, vol. RAN WG1, May 4, 2010, XP050598331, Sophia-Antipolis Cedex ; France [retrieved on May 4, 2010] p. 1-p. 2 figure 1.
CATT: "PDCCH search space design in LTE-A", 3GPP Draft; R1-103466, 3rd Generation Partnership Project (3GPP), Mobile Competence Centre, vol. RAN WG1, Jun. 22, 2010, XP050448987, Sophia-Antipolis Cedex ; France [retrieved on Jun. 22, 2010] Section 2.2.
ETRI: "DCI format ambiguity in the overlapping region of common and UE-specific search spaces in cross-carrier scheduling", 3GPP Draft; R1-103880 Search Space Overlap, 3rd Generation Partnership Project (3GPP), Mobile Competence Centre, vol. RAN WG1, Jun. 22, 2010, XP050449278, Sophia-Antipolis Cedex ; France [retrieved on Jun. 22, 2010] p. 1-p. 2.
Huawei., et al., "Analysis of Solutions for Handling DCI Format Ambiguity between CSS and UESS at Cross-Carrier Scheduling", 3GPP Draft; R1-103434 Analysis of Solutions for Handling DCI Format Ambiguity Between CSS and UESS at Cross-Carrier Scheduling, 3rd Generation Partnership Project (3GPP), Mobile Competence Centre, vol. RAN WG1, Jun. 22, 2010, XP050648389, Sophia-Antipolis C [retrieved on Jun. 22, 2010] Section 2.2.
Partial International Search Report—PCT/US2014/010233—ISA/EPO—Apr. 28, 2014.
QUALCOMM Incorporated: "Clarification of Ambiguous DCI Formats 0 and 1A", 3GPP Draft; R1-112533 Clarification of Ambiguous PDCCH Formats 0 and 1A When A-SRS or A-CSI is Configured, 3rd Generation Partnership Project (3GPP), Mobile Competence Centre, vol. RAN WG1, Aug. 16, 2011, XP050537610, Sophia-Antipolis Cedex ; France [retrieved on Aug. 16, 2011] p. 1-p. 3.

* cited by examiner

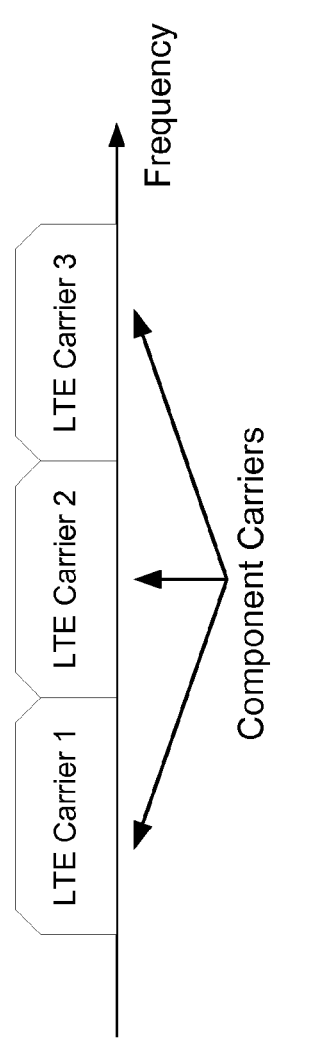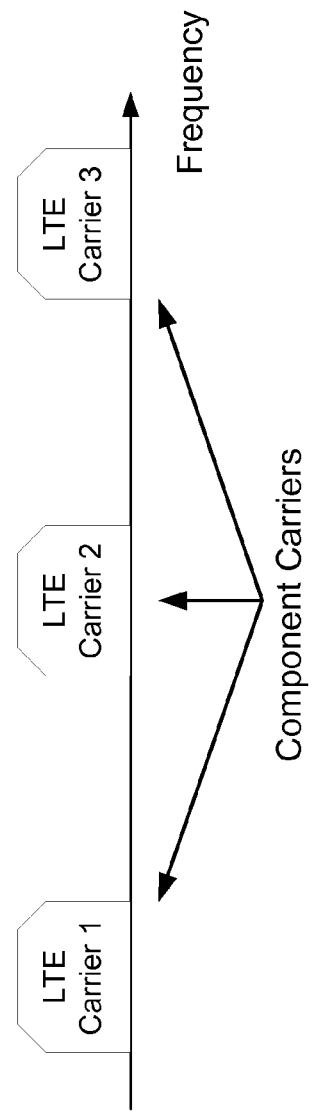

ENB PDCCH IMPLEMENTATION TO AVOID AMBIGUOUS DCI INFORMATION

CROSS-REFERENCE TO RELATED APPLICATION(S)

This application claims the benefit of U.S. Provisional Application Ser. No. 61/748,731, entitled "ENB PDCCH IMPLEMENTATION TO AVOID AMBIGUOUS DCI INFORMATION" and filed on Jan. 3, 2013, and U.S. Provisional Application Ser. No. 61/753,900, entitled "ENB PDCCH IMPLEMENTATION TO AVOID AMBIGUOUS DCI INFORMATION" and filed on Jan. 17, 2013, which are expressly incorporated by reference herein in their entirety.

BACKGROUND

1. Field

The present disclosure relates generally to communication systems, and more particularly, to mitigating ambiguity of downlink control information when a physical downlink control channel (PDCCH) candidate is transmitted in a user equipment specific search space (UESS) or common search space (CSS).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus determines a first starting index for transmitting first control information in a first search space, determines a second starting index for transmitting second control information in a second search space, and transmits the second control information in the second search space at the second starting index when the first starting index and the second starting index are not the same value.

In a further aspect, the apparatus transmits to a UE control information in a first search space, receives information from the UE corresponding to the transmitted control information, and decodes the received information based on the UE parsing the control information according to the first search space and based on the UE incorrectly parsing the control information according to a second search space.

In another aspect, the apparatus determines a first aggregation level having a number of control channel elements (CCEs) used for first control information in a first search space, transmits second control information in a second search space using a second aggregation level having a lower value than the first aggregation level, wherein the second search space is enclosed within the first search space, and wherein a starting CCE for the first control information in the first search space is the same as a starting CCE for the second control information in the second search space, determines at least one CCE of the first aggregation level not used for transmitting the second control information, and transmits interference on the at least one unused CCE to degrade decoding of the first control information in the first search space.

In yet another aspect, the apparatus determines a first starting index for transmitting a first control message in a first search space, determines a second starting index for transmitting a second control message in a second search space, and when the first starting index and the second starting index have the same value, determines at least one information field different between the first control message and the second control message, and sets a bit of the at least one different information field to zero in the first control message and the second control message.

In an aspect, the apparatus generates first control information for transmitting in a first search space, codes the first control information, wherein the code applied to the first control information is specific to the first search space and different from code applied to second control information in a second search space, and transmits the coded first control information in the first search space.

In another aspect, the apparatus generates control information in a first search space, determines a size of a first payload including the generated control information for the first search space, adjusts the size of the first payload to be different from a second payload for a second search space, and transmits the first payload having the adjusted size in the first search space.

In a further aspect, the apparatus generates first control information for transmitting in a first search space. For a first subset of subframes, the apparatus assigns a first priority to the first control information in the first search space, the first priority higher than a second priority assigned to second control information in a second search space, and transmits the first control information with the assigned first priority in the first search space. For a second subset of subframes, the apparatus assigns a third priority to the first control information in the first search space, the third priority lower than a fourth priority assigned to the second control information in the second search space, and transmits the first control information with the assigned third priority in the first search space.

In yet a further aspect, the apparatus determines a first decoding candidate (e.g., first PDCCH candidate) in a first search space and a second decoding candidate (e.g., second PDCCH candidate) in a second search space, where the first decoding candidate and the second decoding candidate have a same size but different definitions of information fields, identifies a difference in the information fields, and determines one of the first decoding candidate and the second decoding candidate as a valid candidate based on the identified difference.

BRIEF DESCRIPTION OF THE DRAWINGS

FIG. 7A discloses a continuous carrier aggregation type.

FIG. 7B discloses a non-continuous carrier aggregation type.

DETAILED DESCRIPTION

Figure 1:
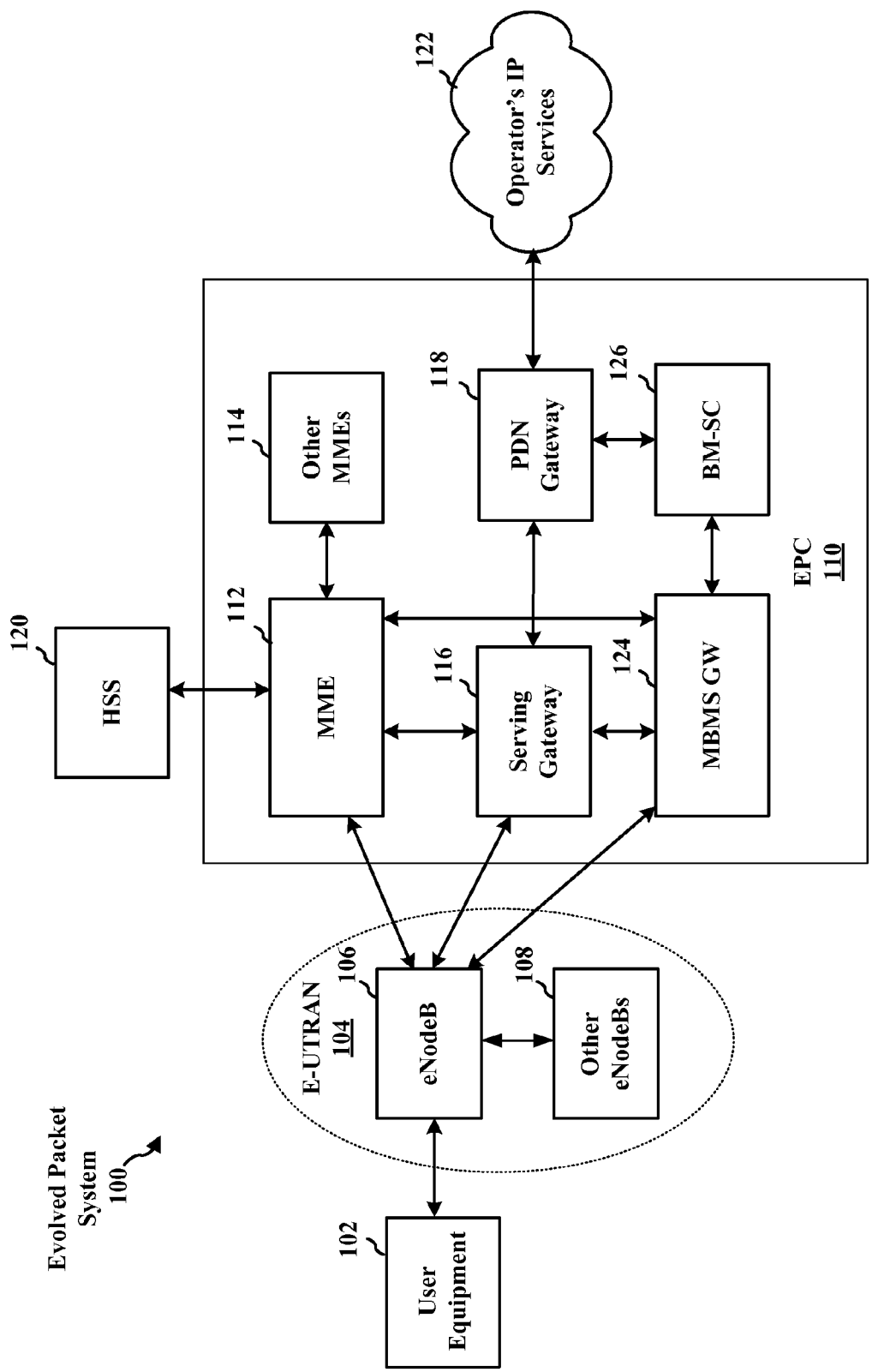
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 is the source of MBMS traffic. The MBMS Gateway 124 distributes the MBMS traffic to the eNBs 106, 108.

Figure 2:
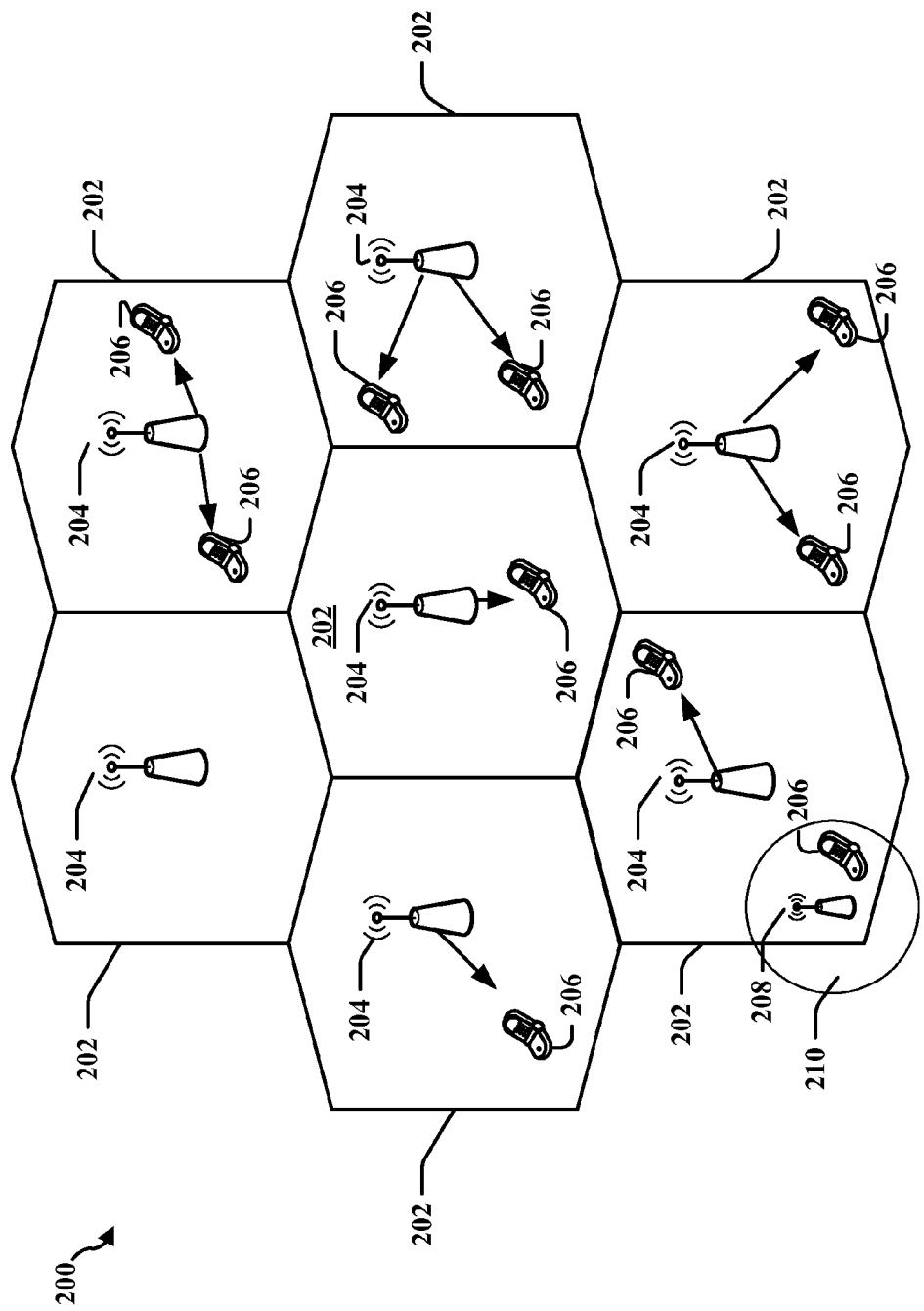
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
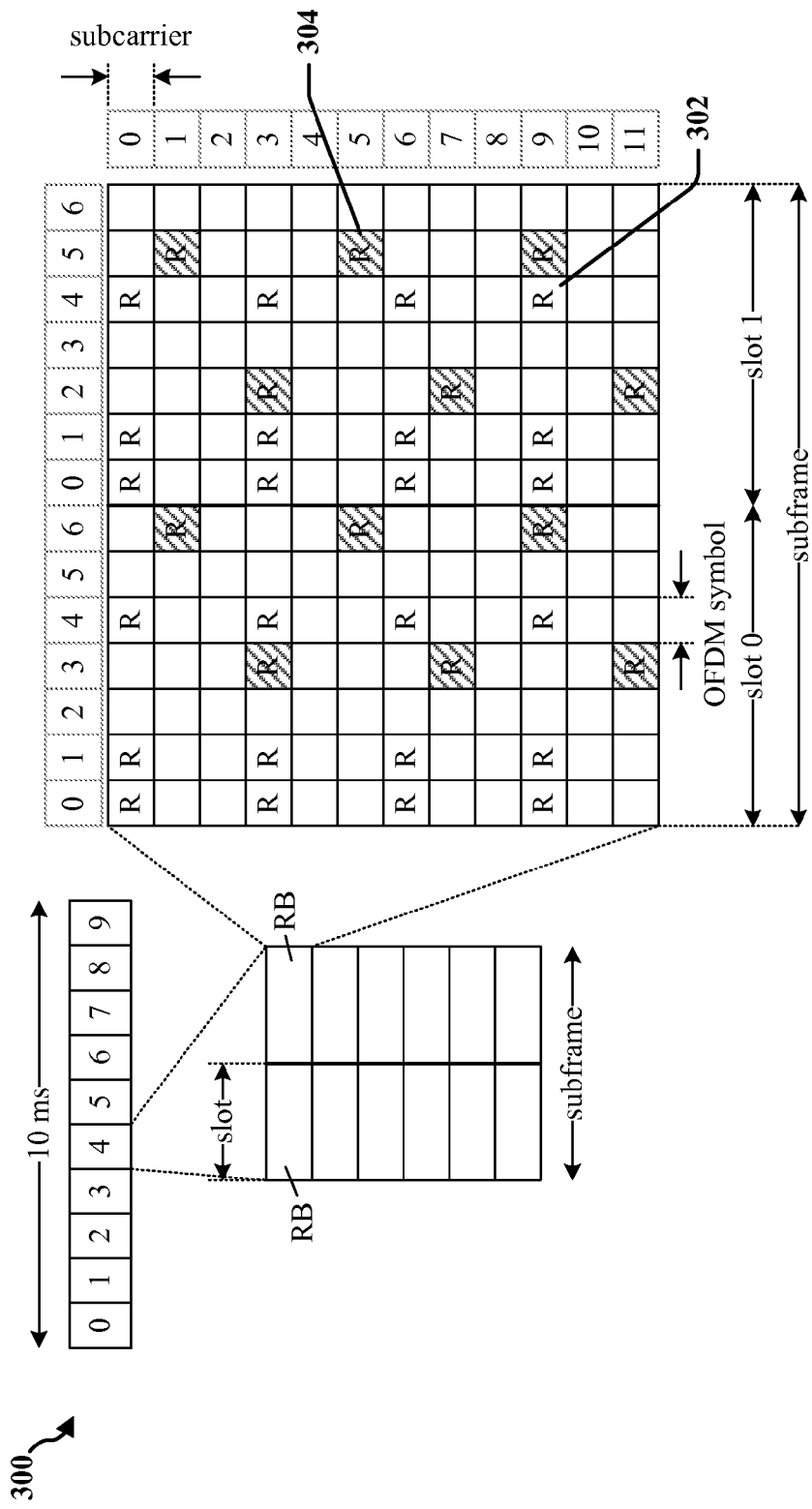
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
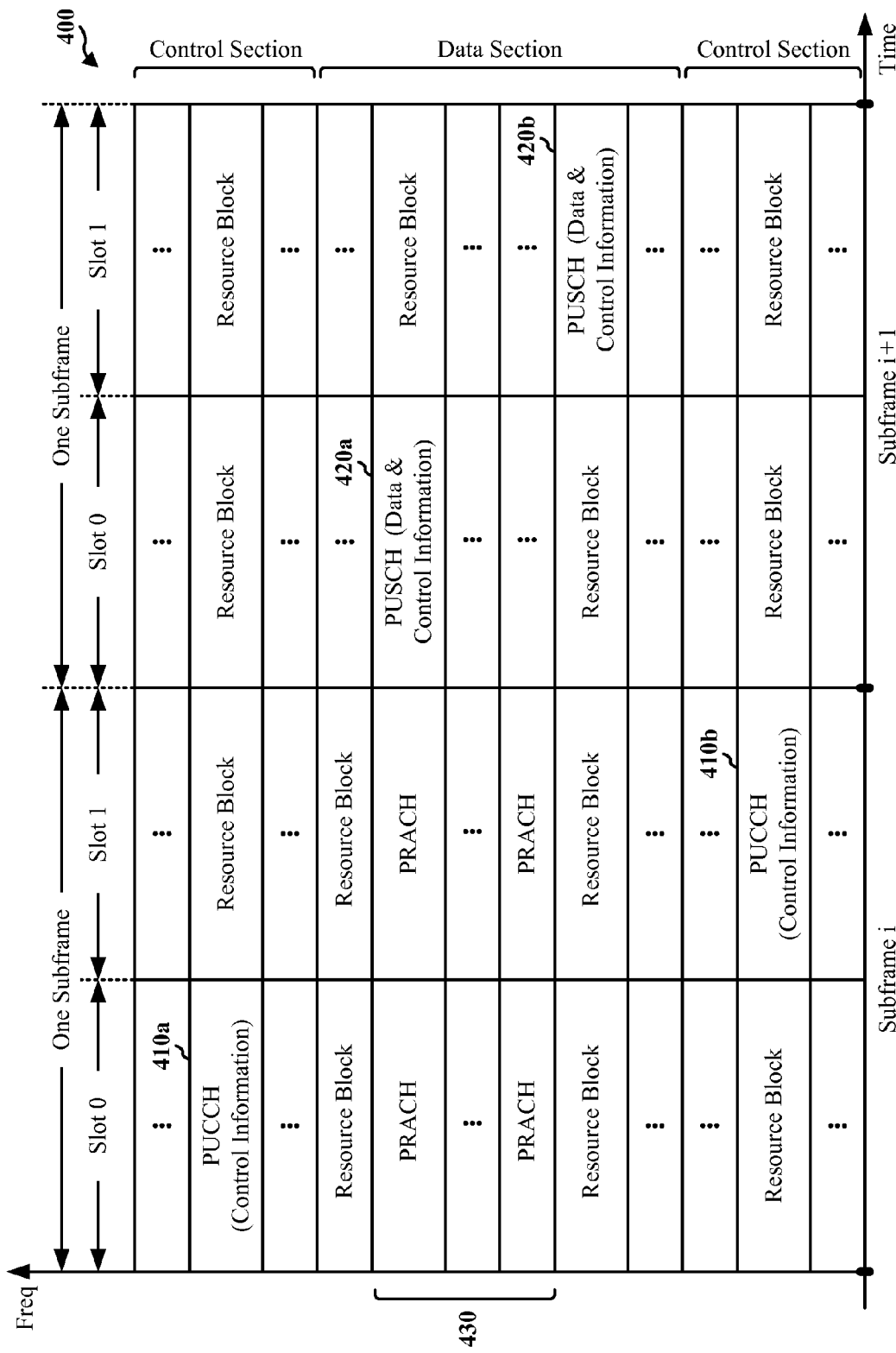
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
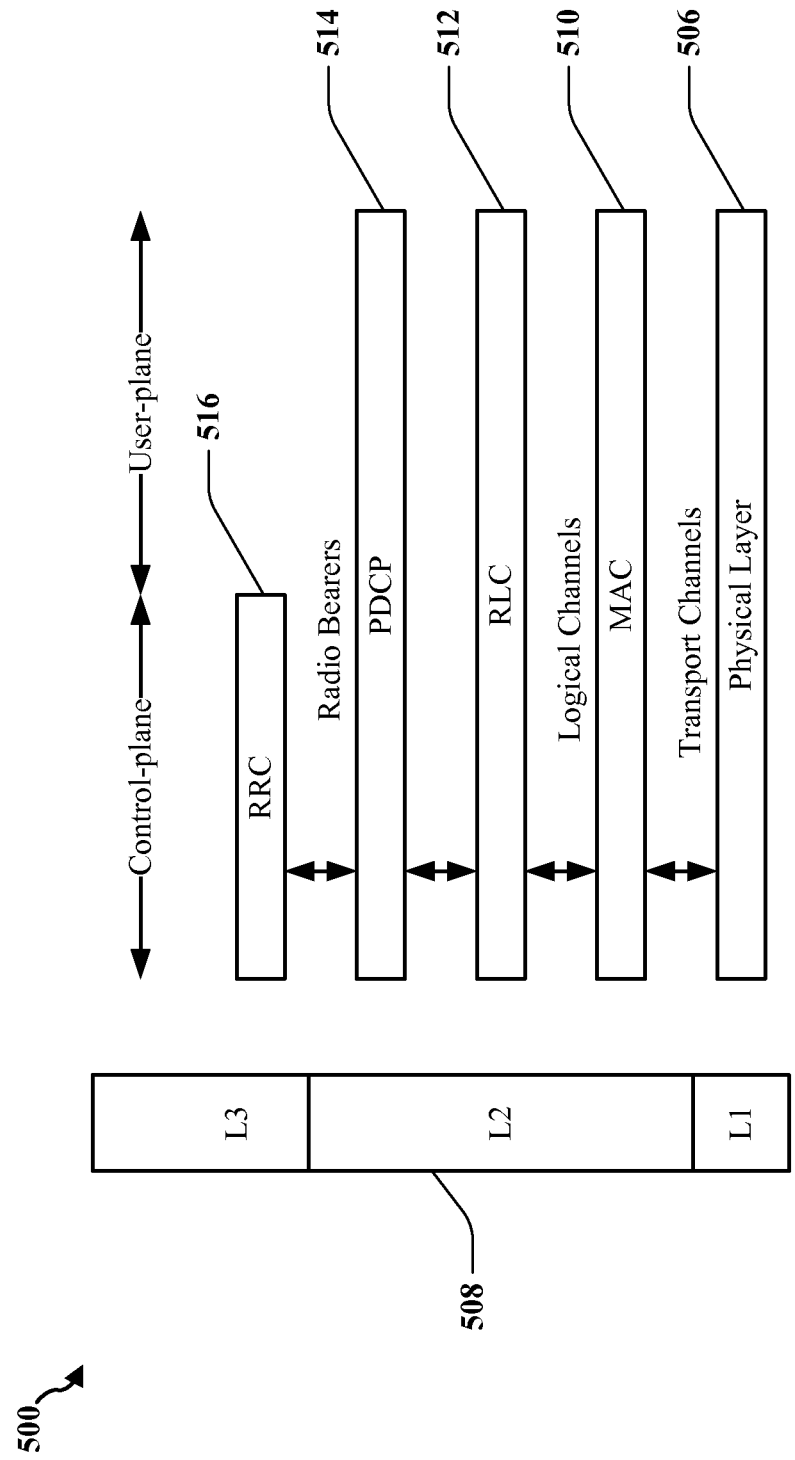
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
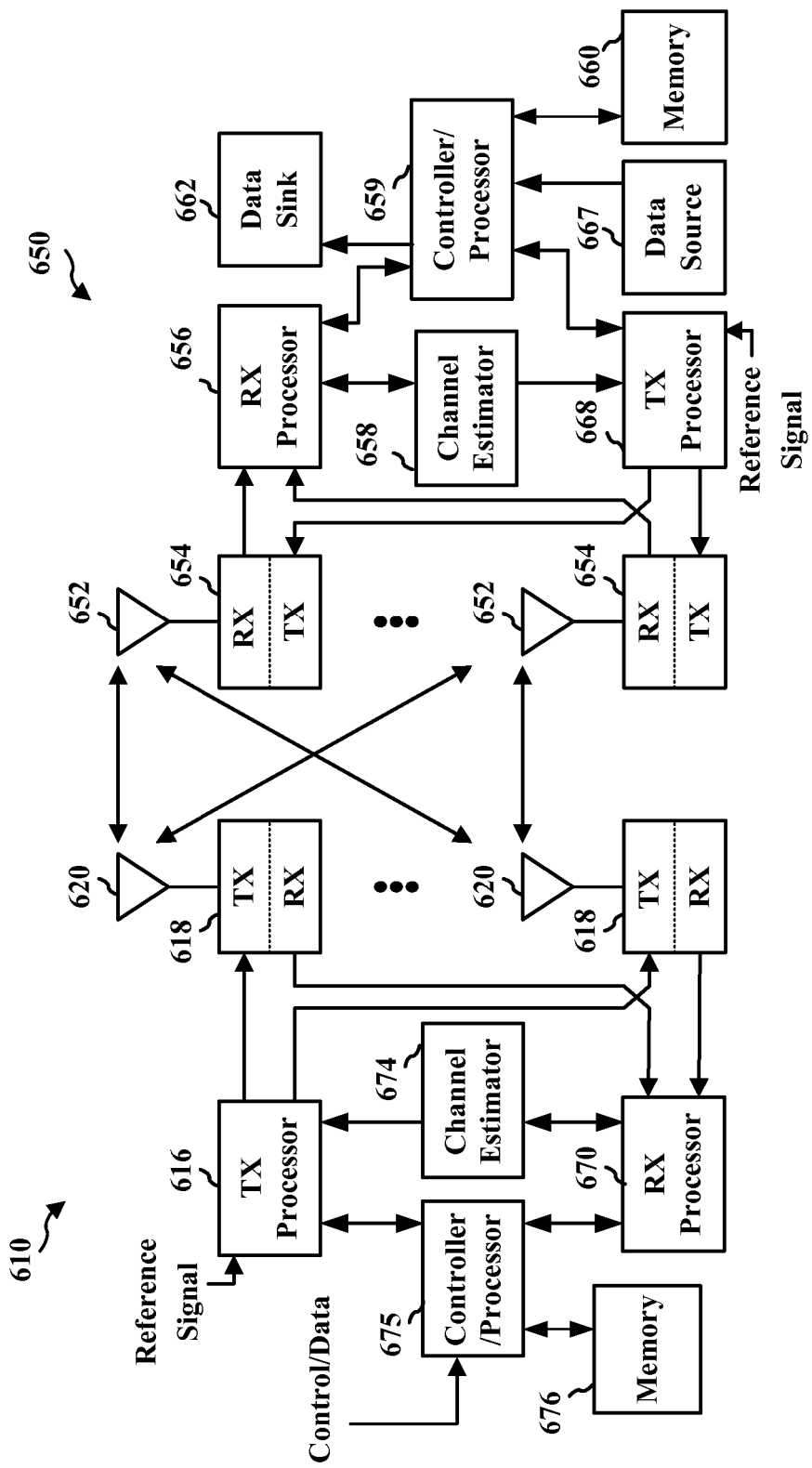
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

LTE-Advanced UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments conserve spectrum and are a good fit for the typically asymmetric bandwidth utilization by broadband subscribers.

For LTE-Advanced mobile systems, two types of carrier aggregation (CA) methods may be provided, continuous CA and non-continuous CA. They are illustrated in FIGS. 7A and 7B. Non-continuous CA occurs when multiple available component carriers are separated along the frequency band (FIG. 7B). On the other hand, continuous CA occurs when multiple available component carriers are adjacent to each other (FIG. 7A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift, and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Interpretation of a physical downlink control channel (PDCCH) downlink control information format 0 (DCI0) payload may depend on whether a UE finds DCI0 in a common search space (CSS) or a UE specific search space (UESS). When the CSS overlaps with the UESS and a starting control channel element (CCE) (i.e., starting index) of the CSS is aligned with a starting CCE of the UESS, the UE may select a PDCCH candidate from the CSS when in fact the PDCCH candidate from the UESS is the intended candidate. This may result in the UE incorrectly parsing the DCI payload leading to misalignment between an eNB and the UE (e.g., a mismatch between an actual UE behavior and a UE behavior expected by the eNB). Hence, a change in PDCCH scheduling may be needed to avoid the mismatch between the actual UE behavior and the UE behavior expected by the eNB. Accordingly, the present disclosure provides approaches for mitigating the DCI0 ambiguity.

The determination of the starting index for a control channel decoding candidate may be based on a type of a search space, an aggregation level associated with the decoding candidate, a UE-specific radio network temporary identifier (RNTI), and/or a number of control channel elements (CCEs) in a subframe. A UE may first determine a number of CCEs in a subframe. If the search space is a CSS, a set of aggregation levels and a set of decoding candidates for a given aggregation level may be determined. Each aggregation level consists of a number of CCEs. For example, a UE may determine that there are aggregation levels 4 and 8 in the CSS, and there are four and two decoding candidates for aggregation levels 4 and 8, respectively. The starting index for aggregation level 4 for the four decoding candidates may start from 0 and be multiples of four, i.e., CCE0, CCE4, CCE8 and CCE12 for the four decoding candidates of aggregation level 4. The starting index for aggregation level 8 for the two decoding candidates may start from 0 and be multiples of eight, i.e., CCE0 and CCE8 for the two decoding candidates of aggregation level 8. If the search space is a UESS, the UE may first determine a starting index for an aggregation level. The starting index can be derived based on a UE-specific RNTI, some random seeds, and the number of CCEs in the subframe. The starting index can be different for different subframes. The starting index for an aggregation level L may be multiples of L. As an example, in a subframe of 40 CCEs, the UE may determine that the starting index for aggregation level 1 is 7, 8, 9, 10, 11, and 12 respectively, for six decoding candidates of aggregation level 1. The UE may determine that the starting index for aggregation level 2 is 16, 18, 20, 22, 24, and 26, respectively, for six decoding candidates of aggregation level 2. The UE may determine that the starting index for aggregation level 4 is 28, 32, 36, and 0, respectively, for four decoding candidates of aggregation level 4. The UE may determine that the starting index for aggregation level 8 is 8 and 16, respectively, for two decoding candidates of aggregation level 8.

Wireless standard specifications (e.g., LTE standards) may provide a selection rule in case of ambiguity in determining whether a PDCCH candidate is transmitted in the UESS or CSS. For example, the CSS may be prioritized over the UESS. Specifically, a UE configured to monitor PDCCH candidates with CRC scrambled by cell radio network temporary identifier (C-RNTI) or semi-persistent scheduling (SPS) C-RNTI with a common payload size and with the same first CCE index but with different sets of DCI information fields in the CSS and UESS on the primary cell may assume that only the PDCCH in the CSS is transmitted by the primary cell.

The selection rule provided by the wireless standard specifications defines UE behavior in case of common payload and starting CCE, and may be applied irrespective of aggregation level (AL). Specifically, the UE may prioritize the CSS over the UESS in the case of a common payload, the same starting CCE, and either the same aggregation level or different aggregation levels.

In case of the same aggregation level, same payload, and fully coincident PDCCH resources in CSS and UESS (e.g., same start CCE), the UE may not be able to distinguish between DCI0 sent on the UESS and DCI0 sent on the CSS. For example, the UE selecting the DCI0 candidate from the CSS may lead to misalignment between the UE and eNB when the intended DCI0 candidate is from the UESS.

In the case of different aggregation levels, with common payload, and same start CCE, a DCI0 candidate from the CSS with a higher aggregation level may be seen by the UE as a DCI0 candidate in the UESS with a lower aggregation level. For example, DCI0 sent in the CSS with aggregation level 4 may be difficult to distinguish from DCI0 sent in the UESS with aggregation level 2 when there is a high signal-to-noise ratio (SNR) and the starting CCE indices are the same.

PDCCH candidates comprise a number of consecutive CCEs. A PDCCH is transmitted on one or an aggregation of several consecutive CCEs. Aggregation level (AL) 1 comprises a single CCE. ALs 2, 4, and 8 correspond to 2, 4, and 8 consecutive CCEs, respectively. The size of a search space may be determined by the number of PDCCH candidates and the size of the CCE aggregation level. For example, the size of the search space may be defined as the number of CCEs per PDCCH candidate times the number of PDCCH candidates. Hence, the search space size is a function of aggregation level. The number of CCE aggregation levels supported by the CSS may be limited to 4 and 8. The UESS may support CCE aggregation levels 1, 2, 4 and 8. In general, if a lower aggregation level candidate is fully enclosed in a higher aggregation level candidate and starting CCEs and payloads are the same, similarity of post de-rate matching metrics across different aggregation level hypotheses may lead to the UE decoding both candidates. In this case, reliable detection of the CSS versus the UESS can be difficult and may require a decoding decision based on raw data. However, a decoding decision based on raw data may significantly add to UE processing requirements.

In an example, when the UE is configured with two downlink frequency division duplex (FDD) cells, each cell having 10 MHz bandwidth, and each cell not signaling sounding reference signals (SRS) and carrier index fields, the payload of DCI0 for both the CSS and the UESS is 43 bits. For the CSS, a 1-bit CQI request may be used along with a padding bit. For the UESS, a 2-bit CQI request may be used with no padding. If the eNB transmits DCI0 on the UESS with aggregation level 2 and starting CCE0 so that the UESS is embedded in the CSS, the UE may not be able to distinguish between a CSS with aggregation level 4 and a UESS with aggregation level 2, and may select the CSS candidate when the UESS candidate should be selected. If, in addition, the CSI request field is "10" and the Secondary cell (Scell) belongs to trigger group 0, the UE and eNB may disagree on the number of expected CQI reports, triggering a PUSCH block error rate (BLER).

In the example above, only the CSI request field being set to "10" results in ambiguity. DCI0 with the CSI request field set to "11" or "01" will be decoded as the UESS candidates. A CSI request field set to "00" has the same interpretation for both the UESS and the CSS. To avoid ambiguous behavior, regardless of aggregation level, eNB PDCCH scheduling should account for and mitigate ambiguous DCI0 decodes, as will be discussed in the present disclosure.

In an aspect, eNB scheduling may be improved to mitigate ambiguous DCI0 decodes. Since the ambiguity stems from the CSS and the UESS having a same starting CCE, regardless of aggregation level, ambiguity can be avoided by the eNB ensuring that the starting CCE for DCI0 message in the UESS is not a starting CCE in the CSS.

For example, where a total number of available CCEs ($N_{CCE}$) is $N_{CCE}=8$, the starting CCE index for candidate m and aggregation level L may be given by:

$$L\{(Y_k+m) \bmod \lfloor N_{CCE}/L \rfloor\},$$

where $Y_k$ is used to randomize the starting index as a function of RNTI and slot number, where $Y_k$ can take unique values between 0 and 65536, and m is the candidate index that can take values between 0 and $\lfloor N_{CCE}/L \rfloor - 1$.

As mentioned in the example above, a UE may not be able to distinguish a DCI format 0 sent in the UESS using L=2 with starting index 0 from a DCI format 0 sent in the CSS using L=4 with starting index 0.

However, the eNB may avoid such an ambiguity by: 1) Detecting the existence of the ambiguity; and 2) Finding a starting index that avoids the ambiguity. It can be shown through exhaustive calculation of the above equation that for any given distinct value of $Y_k$, it is possible to find two candidate indices m that result in a starting index not equal to 0 or 4 when L=2, which avoids collision with any message in the CSS that may use L=4 or L=8.

Similarly, it can be shown that for any given distinct value of $Y_k$, it is possible to find at least four candidate indices m that result in a starting index not equal to 0 or 4 when L=1, which avoids collision with any message in the CSS that may use L=4 or L=8. Therefore, it is possible to implement a mechanism at the eNB scheduler where a suitable PDCCH candidate index (i.e., starting CCE) can be calculated that avoids this type of collision.

Alternatively, an eNB implementation may simply detect this type of collision and simply choose not to transmit the PDCCH that contains a DCI format 0 message that may result in ambiguous behavior in a subframe but let $Y_k$ randomize the starting index at a later time to send the DCI format 0 message.

In another aspect, ambiguous DCI0 decodes may be mitigated by performing blind decoding of PUSCH across all relevant payloads corresponding to various numbers of CQI reports whenever there is potential for ambiguity. For example, when the UE incorrectly parses (interprets after decoding) a DCI0 message, a corresponding PUSCH payload may not be aligned with a payload expected by the eNB. This may result in misalignment triggering PUSCH BLER, as described above. However, if the eNB blindly decodes PUSCH across all possible payloads or a subset according to the ambiguous DCI0 decodes, then the eNB will be able to decode PUSCH regardless of whether the UE parsed (interpreted) the DCI0 message correctly. Hence, blind decoding allows the eNB to correctly decode PUSCH across all possible UE interpretations of DCI0 payload. This alleviates misalignment between the eNB and the UE. Furthermore, the eNB can make a decision to retransmit the message that was incorrectly parsed by the UE.

In a further aspect, ambiguous DCI0 decodes may be mitigated by transmitting interference on unused CCEs of a higher aggregation level. For example, when a lower aggregation level candidate is fully enclosed in a higher aggregation level candidate with the same starting CCE and payload, the unused CCEs in the higher aggregation level may not be transmitted, resulting in similar decoding metrics (metrics used to determine successful decoding) between hypotheses in both search spaces. Accordingly, interference may be transmitted on the unused CCEs of the higher aggregation level candidate to degrade the decoding metrics of the hypothesis for the higher aggregation level. For example, transmitting strong enough interference on the unused portion of aggregation level 4 in the CSS results in degraded hypothesis of the CSS candidate at the UE and likely leads to the UE selecting the candidate in the UESS.

In yet another aspect, ambiguous DCI0 decodes may be mitigated by restricting transmission fields that cause ambiguity. The eNB may unify DCI0 message parsing across UE and common search spaces when there is ambiguity. For instance, in the example described above, the eNB may refrain from setting a CSI request field to "10" to avoid the ambiguity.

For example, the following rule can be used at the eNB: If the decoding candidate in the UESS has a same starting CCE as the CSS, set all fields that potentially cause ambiguity to values resulting in common interpretation between DCIs associated with the CSS and the DCIs associated with the UESS. For instance, for information fields in DCI format 0 that include an aperiodic CSI triggering field, an aperiodic SRS triggering field, and a multi-cluster assignment flag field, the eNB may set the corresponding fields (or bits) to zero, such that A-CSI/A-SRS/Multi-cluster are not enabled.

In an aspect, any information fields that are present only in the UESS may be placed towards the end of the corresponding DCI (e.g., located at a latter part of a series of fields of the corresponding DCI). This may maximize the commonality of information between DCI in the CSS and DCI in the UESS such that restriction on the transmission of information fields to avoid ambiguity is minimized.

In an aspect, wireless standard specification approaches address DCI0 payloads that potentially cause ambiguity. A payload potentially causes ambiguity when the payload 1) is valid for both CSS and UESS; and 2) yields different UE behavior depending on whether the payload is detected in CSS or UESS.

To avoid the payload ambiguity, the UESS and CSS may explicitly be distinguished by modifying a coding implementation between the UESS and CSS. This may be accomplished by: 1) implementing different rate matching for UESS than CSS; 2) implementing different interleaving for UESS than CSS; or 3) scrambling UESS cyclic redundancy check (CRC). The above solutions may be backward-compatible with LTE Release 10 UEs or future LTE releases by providing UE capability field(s) advertising support. If supported by the UE, the network may use differentiated coding or scrambling across CSS and UESS by signaling to the UE activation of the differentiated scrambling or coding.

The UE may signal its capability for differentiated coding or scrambling as follows. The UE can advertise support for differentiated coding (e.g., CRC scrambling, rate matching, etc.) in UESS by using a UECapabilityInformation RRC message. This message contains UE-EUTRA-Capability used to convey UE capability parameters. A field can be added to signal UE capability for PDCCH decoding in UESS. The added field may indicate which PDCCH coding of UESS is supported by the UE. The decision to use differentiated coding in UESS is up to the eNB. The eNB may use a RadioResourceConfigDedicated RRC message to enable differentiated coding. For example, a field may be added to a PhysicalConfigDedicated information element to convey that CRC scrambling is enabled.

Alternatively, to avoid the payload ambiguity, a UESS payload may be distinguished from a CSS payload. This may be accomplished by ensuring that the respective payload sizes are different. For example, whenever the UESS and CSS contents may result in payload ambiguity, padding bits may be added to ensure that the payload sizes are also different. This solution may be backward-compatible with existing UEs by providing UE capability field(s) advertising support.

In a further alternative, CSS and UESS may be prioritized dependent on a subframe. For example, in case of ambiguity, CSS may be prioritized over UESS in subframes where UE system information (e.g., paging and SIB) is likely to be received by the UE. Meanwhile, UESS may be prioritized over CSS in other subframes.

For example, in a first set of subframes (e.g., subframes 0, 4, 5, and 9 for a frequency division duplex (FDD) system and subframes 0, 1, 5, and 6 for a time division duplex (TDD) system), CSS has a priority higher than a priority of UESS. In the remaining set of subframes, UESS has a priority higher than a priority of CSS. This allows CSS to provide a fallback operation when the eNB is reconfiguring the UE, and the UE does not have knowledge of new features being activated.

In an aspect, prioritization may be performed such that under some conditions, CSS is assigned a higher priority, while under other conditions, UESS is assigned a higher priority. For example, prioritization between a first DCI from a CSS and a second DCI from a UESS, when the first and the second DCIs have a same size and same starting CCE but different information contents, may be dependent on the difference in the information contents.

For example, the second DCI may contain a cross-carrier scheduling (CIF) information field. This information field may be present at the beginning of the DCI. Accordingly, the first DCI may be assigned a higher priority, such that a fallback operation based on the first DCI is possible.

In another example, the second DCI may contain a 2-bit channel state information (CSI) request field compared with a 1-bit CSI request field in the first DCI. This information field may be present towards the end of the DCI (e.g., located at a latter part of a series of fields of the DCI). Accordingly, the second DCI may be assigned a higher priority to allow a more likely usage of the 2-bit CSI request, without a significant impact on the fallback operation. For instance, the fallback operation may still be performed by transmitting the control channel using a minimum common set of information fields between the first DCI and the second DCI, while setting some or all of the bits corresponding to the distinct information fields between the first DCI and the second DCI such that there is effectively no ambiguity in the information conveyed by the control channel.

Figure 8:
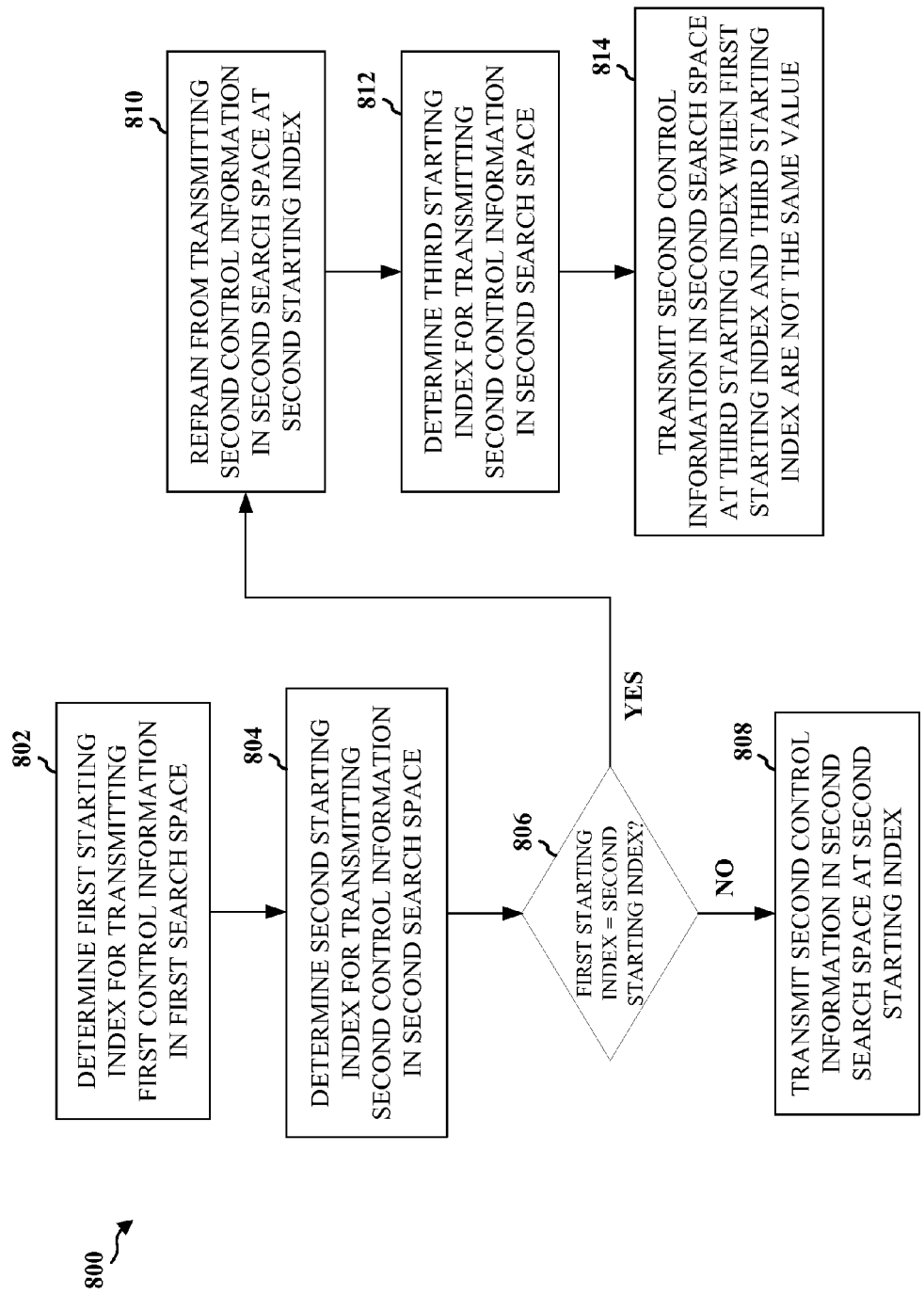
FIG. 8 is a flow chart of a method of wireless communication.

FIG. 8 is a flow chart 800 of a method of wireless communication. The method may be performed by a base station (e.g., an eNB). At step 802, the base station determines a first starting index (e.g., first starting CCE) for transmitting first control information (e.g., first PDCCH DCI0 message) in a first search space. At step 804, the base station determines a second starting index (e.g., second starting CCE) for transmitting second control information (e.g., second PDCCH DCI0 message) in a second search space. In an aspect, the first search space is a common search space (CSS) and the second search space is a user equipment specific search space (UESS). Alternatively, the first search space may be the UESS and the second search space may be the CSS.

The first starting index may be determined based on at least a candidate index and an aggregation level corresponding to the first search space used for transmitting the first control information. The second starting index may be determined based on at least a candidate index and an aggregation level corresponding to the second search space for transmitting the second control information. Accordingly, the base station may select the at least one candidate index for determining the second starting index such that a value of the second starting index is not the same as a value of the first starting index.

For example, where a starting CCE index for candidate m and aggregation level L is given by:

$$L\{(Y_k+m) \bmod \lfloor N_{CCE}/L \rfloor\},$$

where $Y_k$ is used to randomize the starting index as a function of RNTI and slot number, where $Y_k$ can take unique values between 0 and 65536, and m is the candidate index that can take values between 0 and $\lfloor N_{CCE}/L \rfloor-1$, the base station may select a value of m for determining the second starting CCE index such that a value of the second starting CCE index is not the same as a value of the first starting CCE index.

At step 806, the base station determines whether the value of the first starting index is the same as the value of the second starting index. The determination may be performed by comparing the first starting index value to the second starting index value. At step 808, when the first starting index and the second starting index are not the same value, the base station transmits the second control information in the second search space at the second starting index.

When the first starting index and the second starting index are the same value, at step 810, the base station refrains from transmitting the second control information in the second search space at the second starting index. Thereafter, at step 812, the base station determines a third starting index for transmitting the second control information in the second search space. The base station may determine the third starting index not using a starting index value that is the same as the first starting index value. Finally, at step 814, the base station transmits the second control information in the second search space at the third starting index when the first starting index and the third starting index are not the same value.

Figure 9:
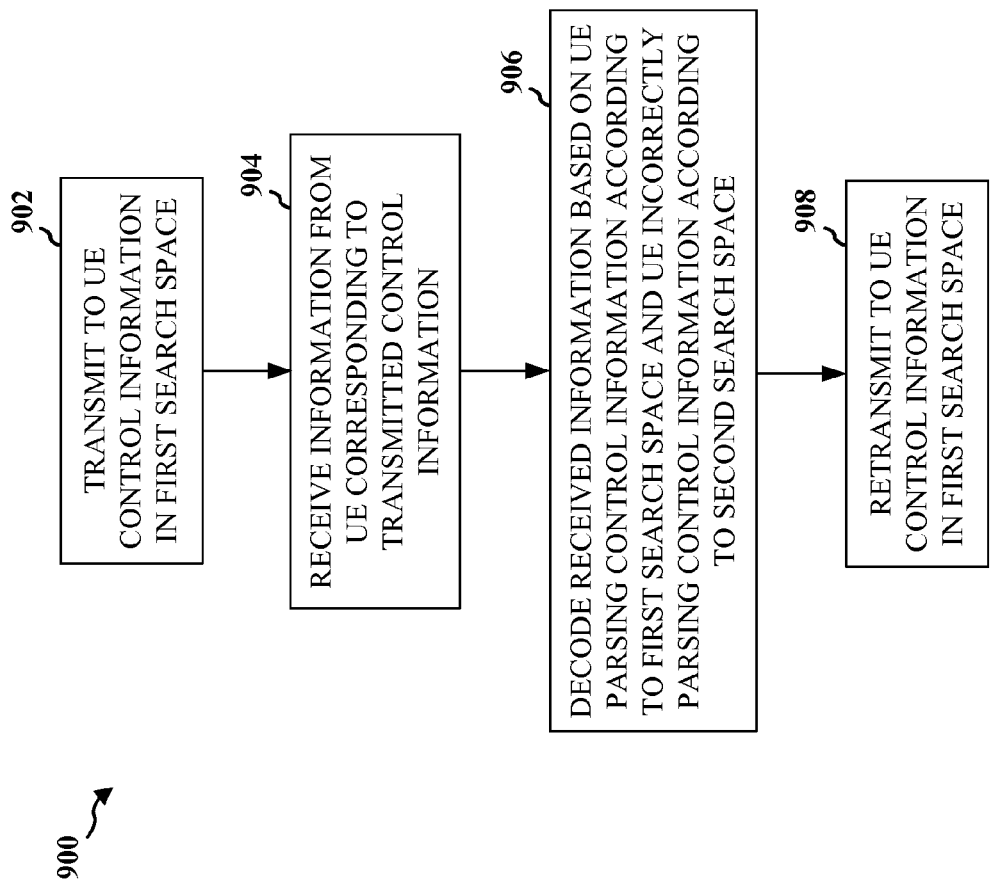
FIG. 9 is a flow chart of a method of wireless communication.

FIG. 9 is a flow chart 900 of a method of wireless communication. The method may be performed by a base station (e.g., an eNB). At step 902, the base station transmits to a user equipment (UE) control information in a first search space. The control information may be transmitted in the first search space at a starting index that is the same as a starting index for transmitting second control information in a second search space. The first search space may be a user equipment specific search space (UESS) and the second search space may be a common search space (CSS). Alternatively, the first search space may be the CSS and the second search space may be the UESS.

At step 904, the base station receives information from the UE corresponding to the transmitted control information. At step 906, the base station decodes the received information based on the UE parsing the control information according to the first search space. The base station also decodes the received information based on the UE incorrectly parsing the control information according to the second search space. Finally, at step 908, the base station may retransmit the control information to the UE in the first search space when the base station learns that the UE incorrectly parsed the control information according to the second search space.

Figure 10:
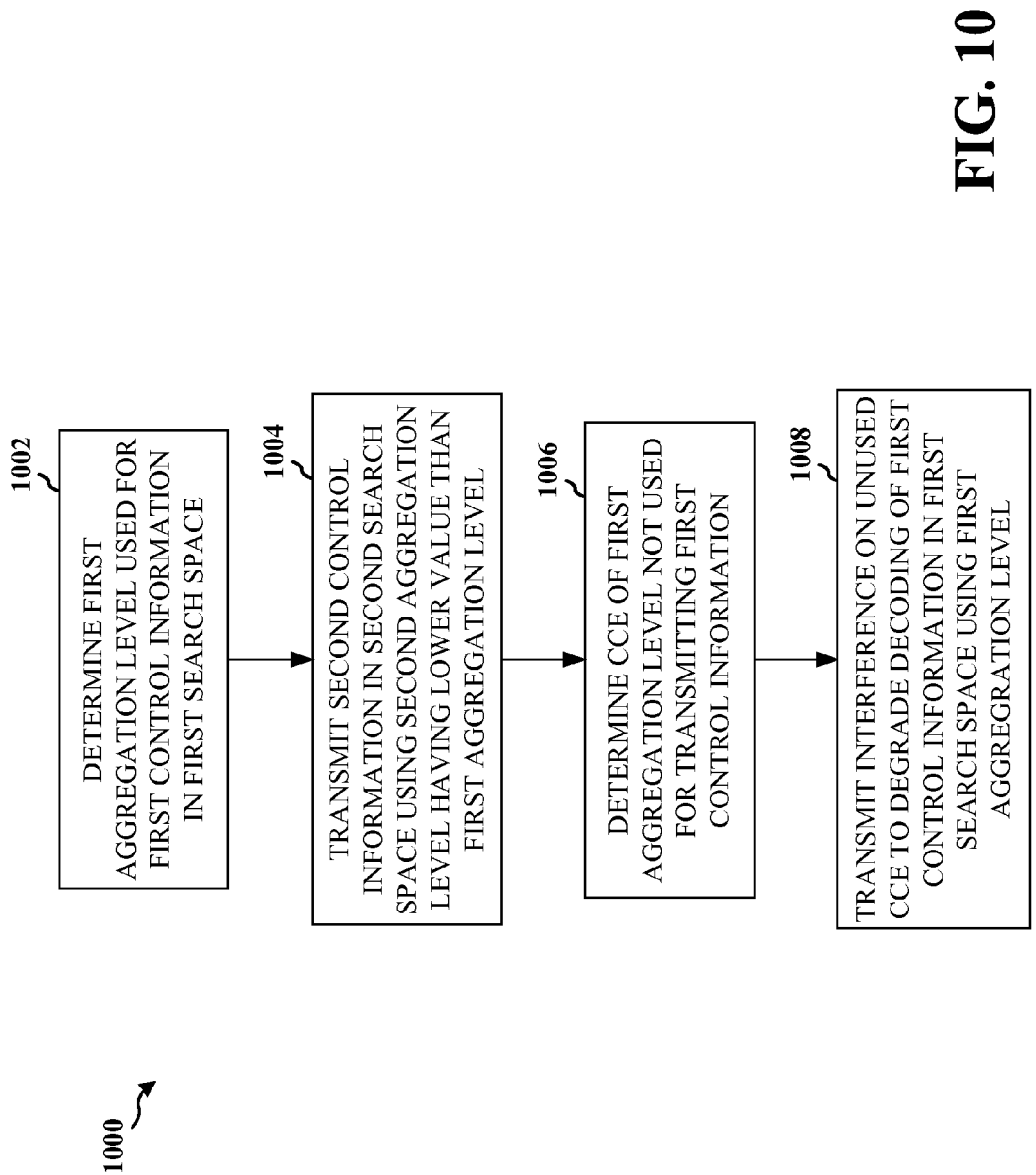
FIG. 10 is a flow chart of a method of wireless communication.

FIG. 10 is a flow chart 1000 of a method of wireless communication. The method may be performed by a base station (e.g., an eNB). At step 1002, the base station determines a first aggregation level having a number of control channel elements (CCEs) used for first control information in a first search space.

At step 1004, the base station transmits second control information in a second search space using a second aggregation level having a lower value than the first aggregation level. The second search space may be enclosed within the first search space. Moreover, a starting CCE for transmitting the first control information in the first search space is the same as a starting CCE for transmitting the second control information in the second search space. The first search space may be a user equipment specific search space (UESS) and the second search space may be a common search space (CSS). Alternatively, the first search space may be the CSS and the second search space may be the UESS.

At step 1006, the base station determines at least one CCE of the first aggregation level not used for transmitting the control information. At step 1008, the base station transmits interference on the at least one unused CCE to degrade decoding of the first control information in the first search space.

Figure 11:
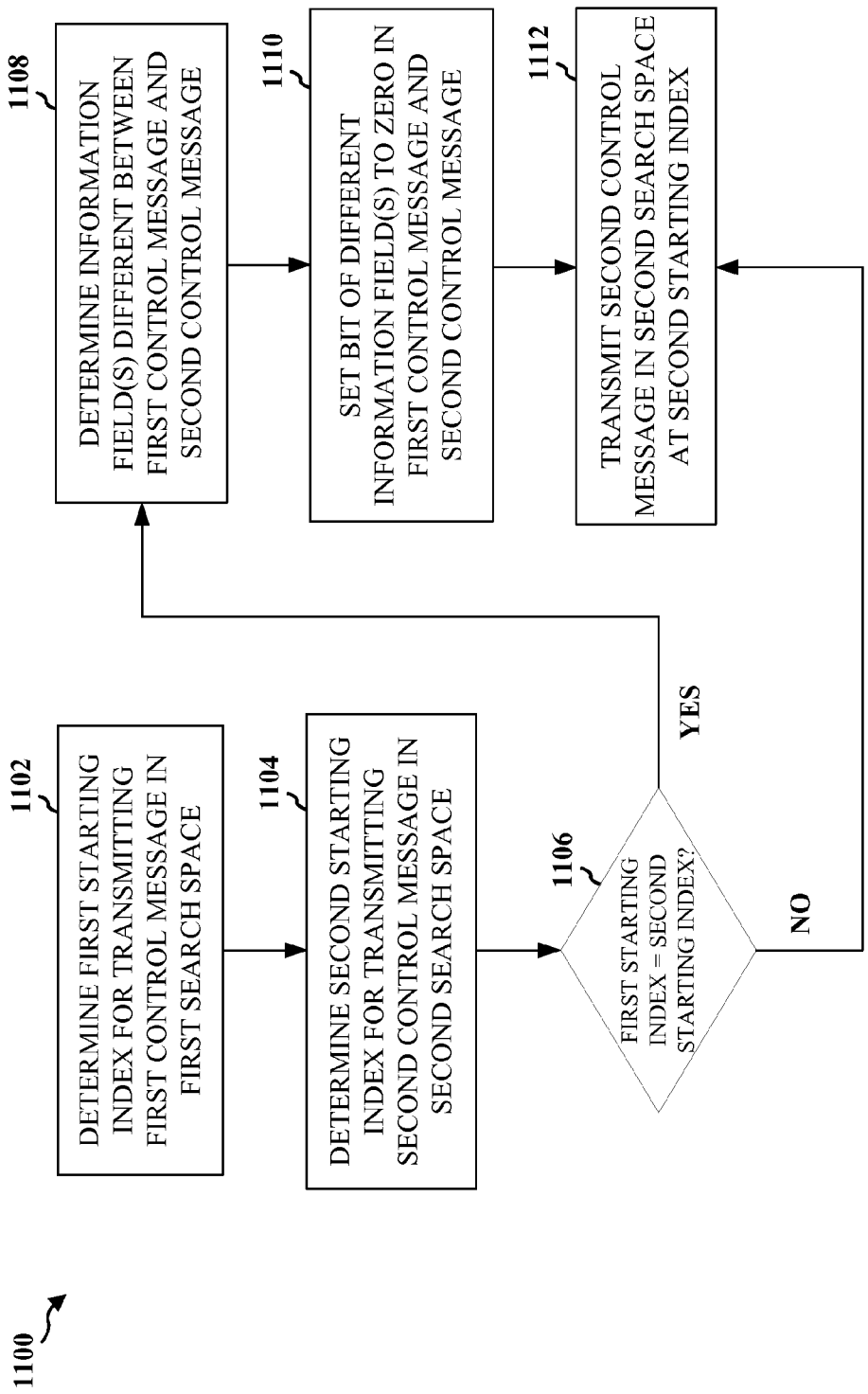
FIG. 11 is a flow chart of a method of wireless communication.

FIG. 11 is a flow chart 1100 of a method of wireless communication. The method may be performed by a base station (e.g., an eNB). At step 1102, the base station determines a first starting index (e.g., a first starting CCE) for transmitting a first control message (e.g., first PDCCH message) in a first search space. At step 1104, the base station determines a second starting index (e.g., a second starting CCE) for transmitting a second control message (e.g., second PDCCH message) in a second search space. In an aspect, the first search space is a common search space (CSS) and the second search space is a user equipment specific search space (UESS). Alternatively, the first search space may be the UESS and the second search space may be the CSS.

At step 1106, the base station determines whether a value of the first starting index is the same as a value of the second starting index. When the first starting index and the second starting index are not the same value, the base station transmits the second control information in the second search space at the second starting index (step 1112).

When the first starting index and the second starting index have the same value, at step 1108, the base station determines at least one information field different between the first control message and the second control message. At step 1110, the base station sets a bit of the at least one different information field to zero in the first control message and the second control message. Thereafter, at step 1112, the base station transmits the second control message in the second search space at the second starting index.

Figure 12:
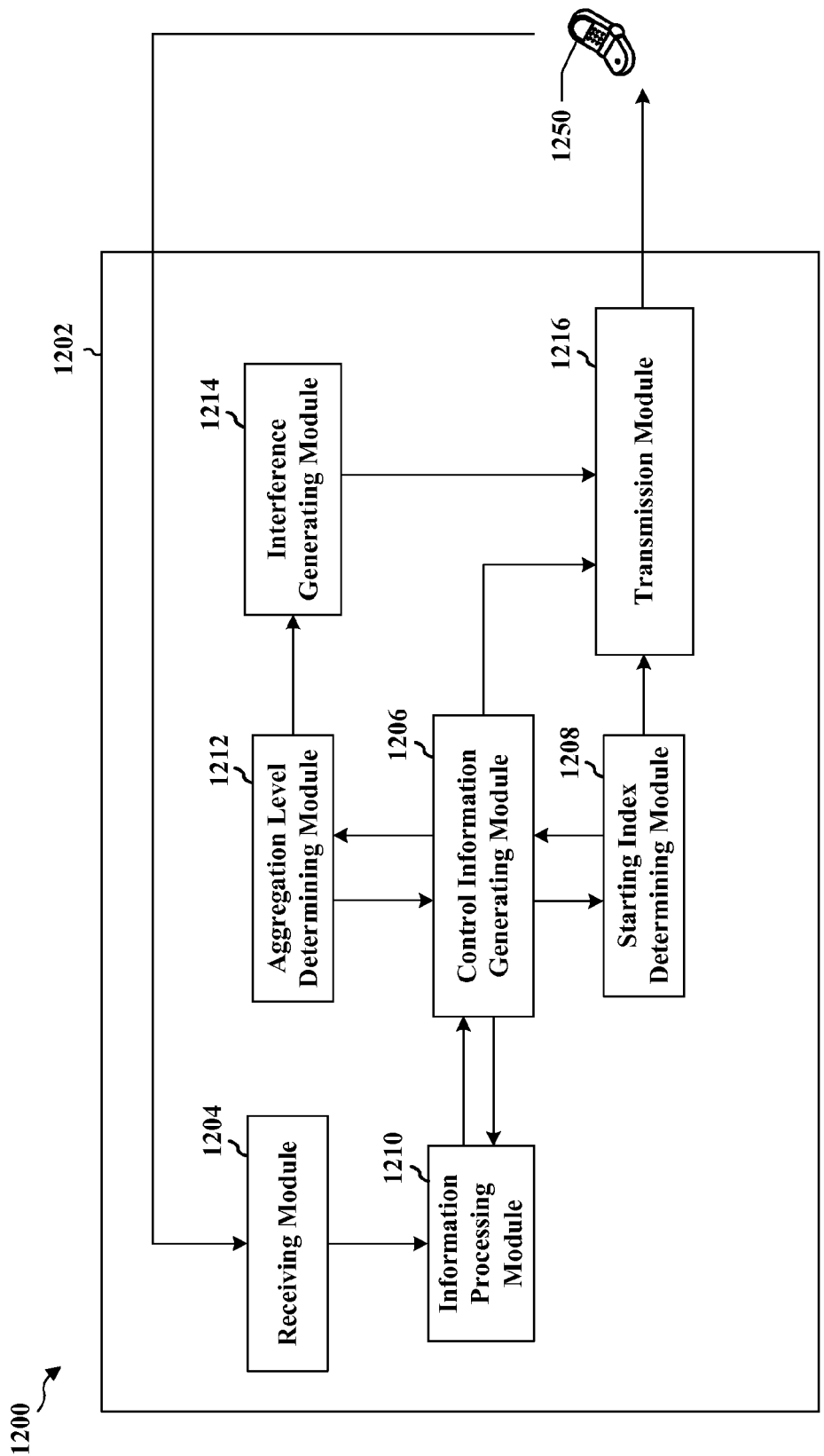
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a base station (e.g., an eNB). The apparatus includes a receiving module 1204, a control information generating module 1206, a starting index determining module 1208, an information processing module 1210, an aggregation level determining module 1212, an interference generating module 1214, and a transmission module 1216.

The starting index determining module 1208 determines a first starting index (e.g., first starting CCE) for first control information (e.g., first PDCCH DCI0 message) in a first search space. The starting index determining module 1208 also determines a second starting index (e.g., second starting CCE) for second control information (e.g., second PDCCH DCI0 message) in a second search space. In an aspect, the first search space is a common search space (CSS) and the second search space is a user equipment specific search space (UESS). Alternatively, the first search space may be the UESS and the second search space may be the CSS.

The first starting index may be determined based on at least a candidate index and an aggregation level corresponding to the first search space used for the first control information. The second starting index may be determined based on at least a candidate index and an aggregation level corresponding to the second search space for the second control information. Accordingly, the starting index determining module 1208 may select the at least one candidate index for determining the second starting index such that a value of the second starting index is not the same as a value of the first starting index.

The starting index determining module 1208 further determines whether the value of the first starting index is the same as the value of the second starting index. When the first starting index and the second starting index are not the same value, the control information generating module 1206 transmits (via transmission module 1216) the second control information in the second search space at the second starting index.

When the first starting index and the second starting index are the same value, the control information generating module 1206 refrains from transmitting the second control information in the second search space at the second starting index. Thereafter, the starting index determining module 1208 determines a third starting index for transmitting the second control information in the second search space.

The starting index determining module 1208 may determine the third starting index by avoiding to use a starting index that has the same value as the first starting index. Finally, the control information generating module 1206 transmits the second control information in the second search space at the third starting index when the first starting index and the third starting index are not the same value.

In an aspect, the control information generating module 1206 transmits (via transmission module 1216) to a UE 1250 control information in a first search space. The control information may be transmitted in the first search space at a starting index that is the same as a starting index for second control information in a second search space. The first search space may be a user equipment specific search space (UESS) and the second search space may be a common search space (CSS). Alternatively, the first search space may be the CSS and the second search space may be the UESS.

The information processing module 1210 receives (via receiving module 1204) information from the UE 1250 corresponding to the transmitted control information. The information processing module 1210 decodes the received information based on the UE 1250 parsing the control information according to the first search space. The information processing module 1210 also decodes the received information based on the UE 1250 incorrectly parsing the control information according to the second search space. Finally, the control information generating module 1206 may retransmit (via transmission module 1216) the control information to the UE 1250 in the first search space when the apparatus 1202 learns that the UE 1250 incorrectly parsed the control information according to the second search space.

In a further aspect, the aggregation level determining module 1212 determines a first aggregation level having a number of control channel elements (CCEs) used for first control information in a first search space. Thereafter, the control information generating module 1206 transmits second control information in a second search space using a second aggregation level having a lower value than the first aggregation level. The second search space may be enclosed within the first search space. Moreover, a starting CCE for the first control information in the first search space is the same as a starting CCE for the second control information in the second search space. The first search space may be a user equipment specific search space (UESS) and the second search space may be a common search space (CSS). Alternatively, the first search space may be the CSS and the second search space may be the UESS.

The interference generating module 1214 determines at least one CCE of the first aggregation level not used for the second control information. Accordingly, the interference generating module 1214 transmits interference on the at least one unused CCE to degrade decoding of the first control information in the first search space.

In another aspect, the starting index determining module 1208 determines a first starting index (e.g., first starting CCE) for a first control message (e.g., first PDCCH message) in a first search space. The starting index determining module 1208 also determines a second starting index (e.g., second starting CCE) for a second control message (e.g., second PDCCH message) in a second search space. In an aspect, the first search space is a common search space (CSS) and the second search space is a user equipment specific search space (UESS). Alternatively, the first search space may be the UESS and the second search space may be the CSS.

The starting index determining module 1208 further determines whether a value of the first starting index is the same as a value of the second starting index. When the first starting index and the second starting index are not the same value, the control information generating module 1206 transmits (via transmission module 1216) the second control information in the second search space at the second starting index.

When the first starting index and the second starting index have the same value, the control information generating module 1206 determines at least one information field different between the first control message and the second control message. Thereafter, the control information generating module 1206 sets a bit of the at least one different information field to zero in the first control message and the second control message. Finally, the control information generating module 1206 transmits the second control message in the second search space at the second starting index.

The apparatus may include additional modules that perform each of the steps of the algorithm in the aforementioned flow charts of FIGS. 8-11. As such, each step in the aforementioned flow charts of FIGS. 8-11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
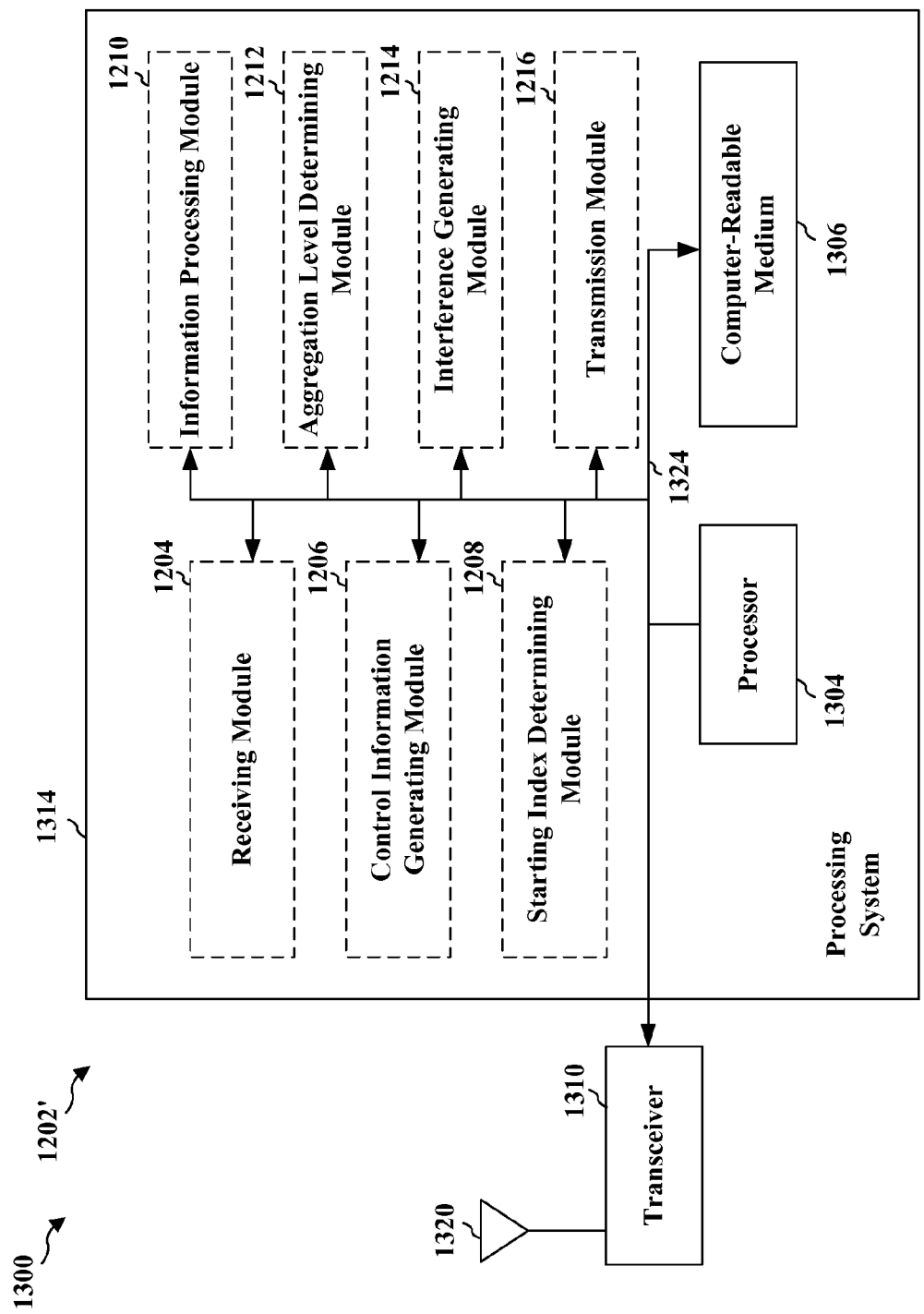
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214, 1216, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1204. In addition, the transceiver 1310 receives information from the processing system 1314, specifically the transmission module 1216, and based on the received information, generates a signal to be applied to the one or more antennas 1320. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, 1212, 1214, and 1216. The modules may be software modules running in the processor 1304, resident/stored in the computer readable medium 1306, one or more hardware modules coupled to the processor 1304, or some combination thereof. The processing system 1314 may be a component of the eNB 610 and may include the memory 676 and/or at least one of the TX processor 616, the RX processor 670, and the controller/processor 675.

In one configuration, the apparatus 1202/1202' for wireless communication includes means for determining a first starting index for first control information in a first search space, means for determining a second starting index for second control information in a second search space, means for transmitting the second control information in the second search space at the second starting index when the first starting index and the second starting index are not the same value, means for selecting at least one candidate index for determining the second starting index that results in a value of the second starting index that is not the same as a value of the first starting index, means for refraining from transmitting the second control information in the second search space at the second starting index when the first starting index and the second starting index are the same value, means for determining a third starting index for the second control information in the second search space by avoiding to use a starting index that has the same value as the first starting index, means for transmitting the second control information in the second search space at the third starting index when the first starting index and the third starting index are not the same value, means for transmitting to a user equipment (UE) control information in a first search space, means for receiving information from the UE corresponding to the transmitted control information, means for decoding the received information based on the UE parsing the control information according to the first search space and based on the UE incorrectly parsing the control information according to a second search space, means for retransmitting the control information to the UE in the first search space, means for determining a first aggregation level having a number of control channel elements (CCEs) used for first control information in a first search space, means for transmitting second control information in a second search space using a second aggregation level having a lower value than the first aggregation level, wherein the second search space is enclosed within the first search space, and wherein a starting CCE for the first control information in the first search space is the same as a starting CCE for the second control information in the second search space, means for determining at least one CCE of the first aggregation level not used for the control information, means for transmitting interference on the at least one unused CCE to degrade decoding of the first control information in the first search space, means for determining a first starting index for a first control message in a first search space, means for determining a second starting index for a second control message in a second search space, when the first starting index and the second starting index have the same value, means for determining at least one information field different between the first control message and the second control message, means for setting a bit of the at least one different information field to zero in the first control message and the second control message, and means for transmitting the second control message in the second search space at the second starting index.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 14:
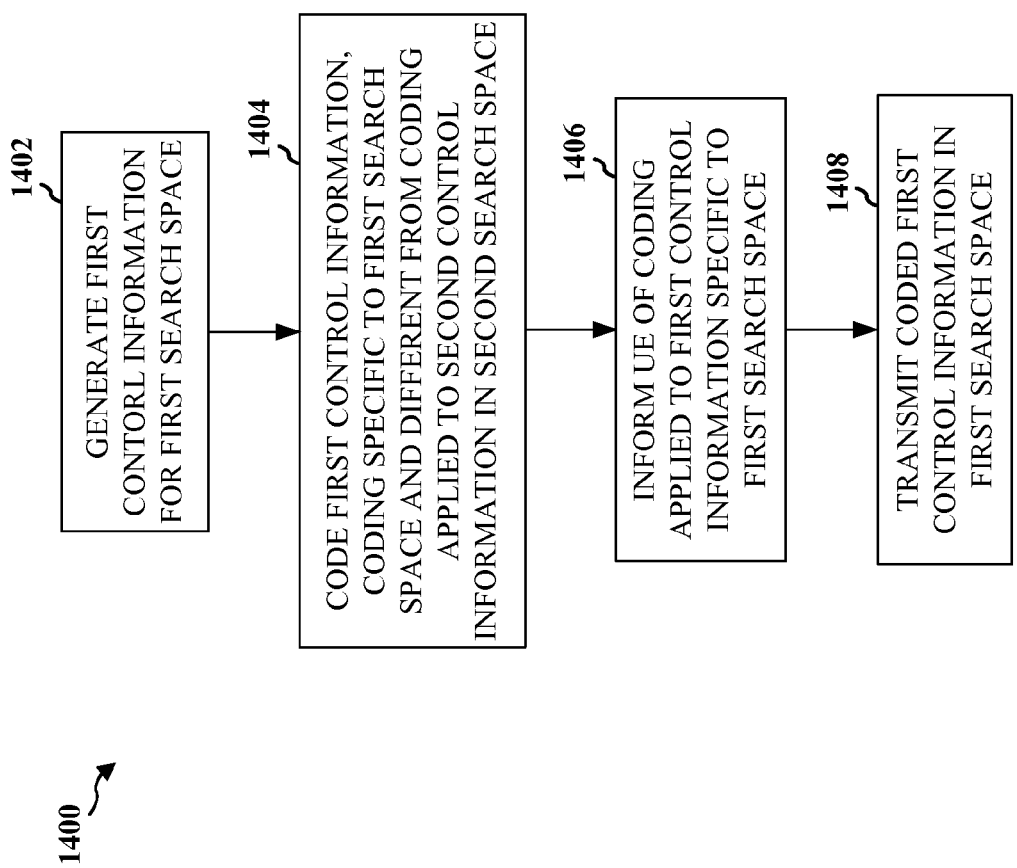
FIG. 14 is a flow chart of a method of wireless communication.

FIG. 14 is a flow chart 1400 of a method of wireless communication. The method may be performed by a base station (e.g., an eNB). At step 1402, the base station generates first control information for transmitting in a first search space. At step 1404, the base station codes the first control information, wherein the coding applied to the first control information is specific to the first search space and different from coding applied to second control information in a second search space. The first search space may be a user equipment specific search space (UESS) and the second search space may be a common search space (CSS).

The coding may be applied to the first control information when the first control information and the second control information have a same set of information fields. Alternatively, the coding may be applied to the first control information when the first control information and the second control information have different sets of information fields.

Applying the coding to the first control information may include at least one of: 1) applying rate matching to the first control information, wherein the rate matching applied to the first control information is specific to the first search space and different from rate matching applied to the second control information in the second search space; 2) interleaving the first control information, wherein the interleaving applied to the first control information is specific to the first search space and different from interleaving applied to the second control information in the second search space; or 3) scrambling the first control information, wherein the scrambling applied to the first control information is specific to the first search space and different from scrambling applied to the second control information in the second search space. Scrambling the first control information may include scrambling a cyclic redundancy check (CRC) of a first message carrying the first control information, wherein the scrambling applied to the CRC of the first message is specific to the first search space and different from scrambling applied to the CRC of a second message in the second search space. For example, scrambling may be performed by applying a bit-wise exclusive-or (XOR) operation on CRC bits using a scrambling sequence. A scrambling sequence may be specific to the first search space and different from a scrambling sequence specific to the second search space. The scrambling sequence may be a pseudo-random sequence. For example, the scrambling sequence may be generated using a Gold sequence generator, where a Gold sequence generator initialization for the first search space is different from a Gold sequence generator initialization for the second search space.

At step 1406, the base station informs a user equipment (UE) of the coding applied to the first control information specific to the first search space. At step 1408, the base station transmits the coded first control information in the first search space.

Figure 15:
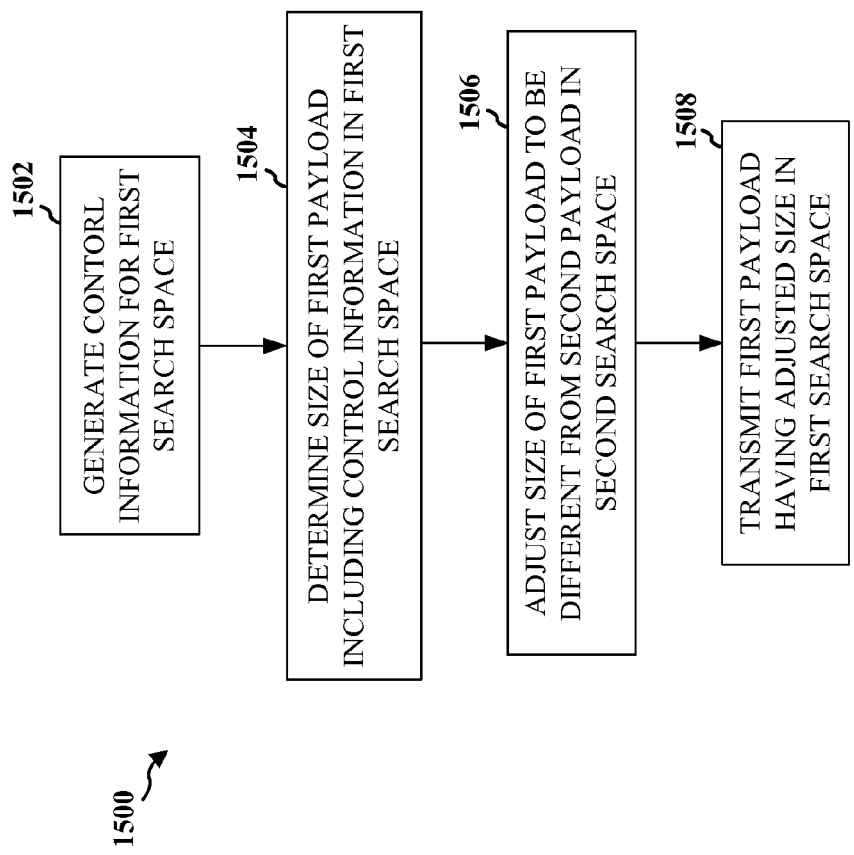
FIG. 15 is a flow chart of a method of wireless communication.

FIG. 15 is a flow chart 1500 of a method of wireless communication. The method may be performed by a base station (e.g., an eNB). At step 1502, the base station generates control information for transmitting in a first search space. At step 1504, the base station determines a size of a first payload including the generated control information for the first search space.

At step 1506, the base station adjusts the size of the first payload to be different from a second payload for a second search space. The first search space may be a user equipment specific search space (UESS) and the second search space may be a common search space (CSS). The adjusting the size of the first payload may include adding padding bits to the first payload to ensure that the size of the first payload is different from the size of the second payload. Also, the size of the first payload may be adjusted when the first payload and the second payload have a same set of information fields. Alternatively, the size of the first payload is adjusted when the first payload and the second payload have different sets of information fields.

At step 1508, the base station transmits the first payload having the adjusted size in the first search space.

Figure 16:
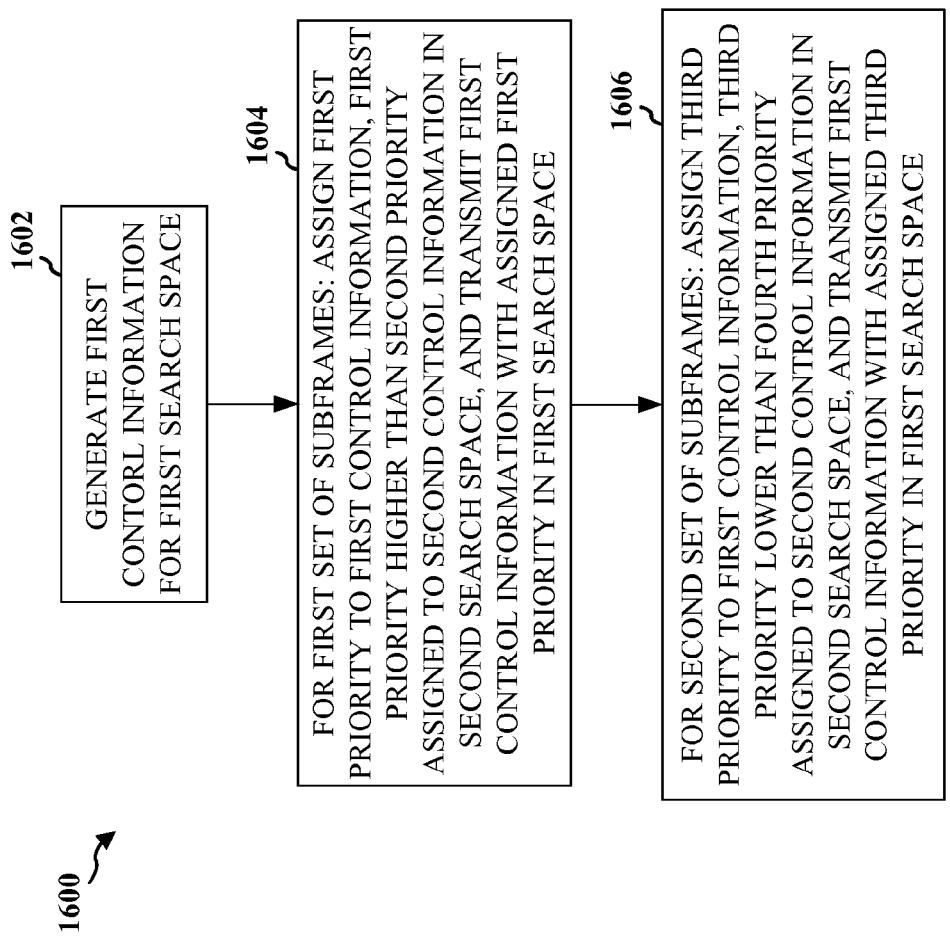
FIG. 16 is a flow chart of a method of wireless communication.

FIG. 16 is a flow chart 1600 of a method of wireless communication. The method may be performed by a base station (e.g., an eNB). At step 1602, the base station generates first control information in a first search space. At step 1604, for a first subset of subframes, the base station assigns a first priority to the first control information in the first search space. The first priority is higher than a second priority assigned to second control information in a second search space. The base station also transmits the first control information with the assigned first priority in the first search space. The first subset of subframes may include subframes where a user equipment (UE) may receive reconfiguration information. For example, the first subset of subframes includes subframes 0, 4, 5, and 9 for a frequency division duplex (FDD) system, and subframes 0, 1, 5, and 6 for a time division duplex (TDD) system.

At step 1606, for a second subset of subframes, the base station assigns a third priority to the first control information in the first search space. The third priority is lower than a fourth priority assigned to the second control information in the second search space. The base station also transmits the first control information with the assigned third priority in the first search space. The first search space may be a common search space (CSS) and the second search space may be a user equipment specific search space (UESS). The second subset of subframes may include subframes where a user equipment (UE) may not receive reconfiguration information.

Figure 17:
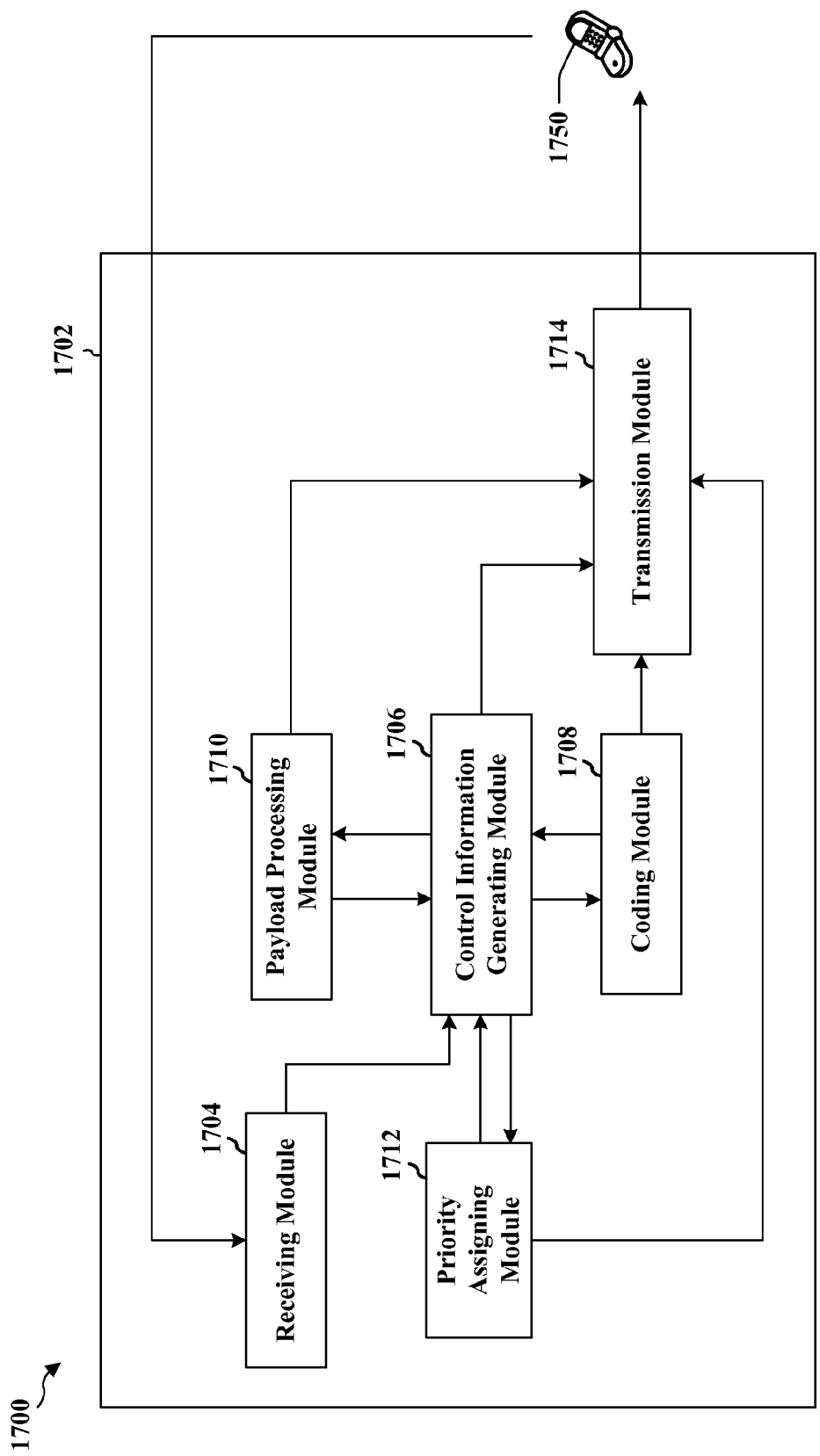
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a base station (e.g., an eNB). The apparatus includes a receiving module 1704, a control information generating module 1706, a coding module 1708, a payload processing module 1710, a priority assigning module 1712, and a transmission module 1714.

The control information generating module 1706 generates first control information for transmitting in a first search space. The coding module 1708 codes the first control information. The coding applied to the first control information may be specific to the first search space and different from coding applied to second control information in a second search space. The first search space may be a user equipment specific search space (UESS) and the second search space may be a common search space (CSS).

The coding module 1708 may apply coding to the first control information when the first control information and the second control information have a same set of information fields. Alternatively, the coding module 1708 may apply coding to the first control information when the first control information and the second control information have different sets of information fields.

Applying the coding to the first control information may include at least one of: 1) applying rate matching to the first control information, wherein the rate matching applied to the first control information is specific to the first search space and different from rate matching applied to the second control information in the second search space; 2) interleaving the first control information, wherein the interleaving applied to the first control information is specific to the first search space and different from interleaving applied to the second control information in the second search space; or 3) scrambling the first control information, wherein the scrambling applied to the first control information is specific to the first search space and different from scrambling applied to the second control information in the second search space. Scrambling the first control information may include scrambling a cyclic redundancy check (CRC) of a first message carrying the first control information, wherein the scrambling applied to the CRC of the first message is specific to the first search space and different from scrambling applied to the CRC of a second message in the second search space. For example, scrambling may be performed by applying a bit-wise exclusive-or (XOR) operation on CRC bits using a scrambling sequence. A scrambling sequence may be specific to the first search space and different from a scrambling sequence specific to the second search space. The scrambling sequence may be a pseudo-random sequence. For example, the scrambling sequence may be generated using a Gold sequence generator, where a Gold sequence generator initialization for the first search space is different from a Gold sequence generator initialization for the second search space.

The coding module 1708 may inform (via the transmission module 1714) a user equipment (UE) 1750 of the coding applied to the first control information specific to the first search space. The control information generating module 1706 and/or the coding module 1708 may transmit (via the transmission module 1714) the coded first control information in the first search space.

In an aspect, the payload processing module 1710 may determine a size of a first payload including the generated control information for the first search space. The payload processing module 1710 may also adjust the size of the first payload to be different from a second payload for a second search space. The first search space may be a user equipment specific search space (UESS) and the second search space may be a common search space (CSS). The adjusting the size of the first payload may include adding padding bits to the first payload. The size of the first payload may be adjusted when the first payload and the second payload have a same set of information fields. Alternatively, the size of the first payload may be adjusted when the first payload and the second payload have different sets of information fields. The payload processing module 1710 may transmit (via the transmission module 1714) the first payload having the adjusted size in the first search space.

In another aspect, for a first subset of subframes, the priority assigning module 1712 assigns a first priority to the first control information in the first search space. The first priority may be higher than a second priority assigned to second control information in a second search space. The control information generating module 1706 transmits (via the transmission module 1714) the first control information with the assigned first priority in the first search space. The first subset of subframes may include subframes where the UE 1750 may receive reconfiguration information. For example, the first subset of subframes includes subframes 0, 4, 5, and 9 for a frequency division duplex (FDD) system, and subframes 0, 1, 5, and 6 for a time division duplex (TDD) system.

For a second subset of subframes, the priority assigning module 1712 assigns a third priority to the first control information in the first search space. The third priority may be lower than a fourth priority assigned to the second control information in the second search space. The control information generating module 1706 also transmits (via the transmission module 1714) the first control information with the assigned third priority in the first search space. The first search space may be a common search space (CSS) and the second search space may be a user equipment specific search space (UESS). The second subset of subframes may include subframes where the UE 1750 may not receive reconfiguration information.

The apparatus may include additional modules that perform each of the steps of the algorithm in the aforementioned flow charts of FIGS. 14-16. As such, each step in the aforementioned flow charts of FIGS. 14-16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
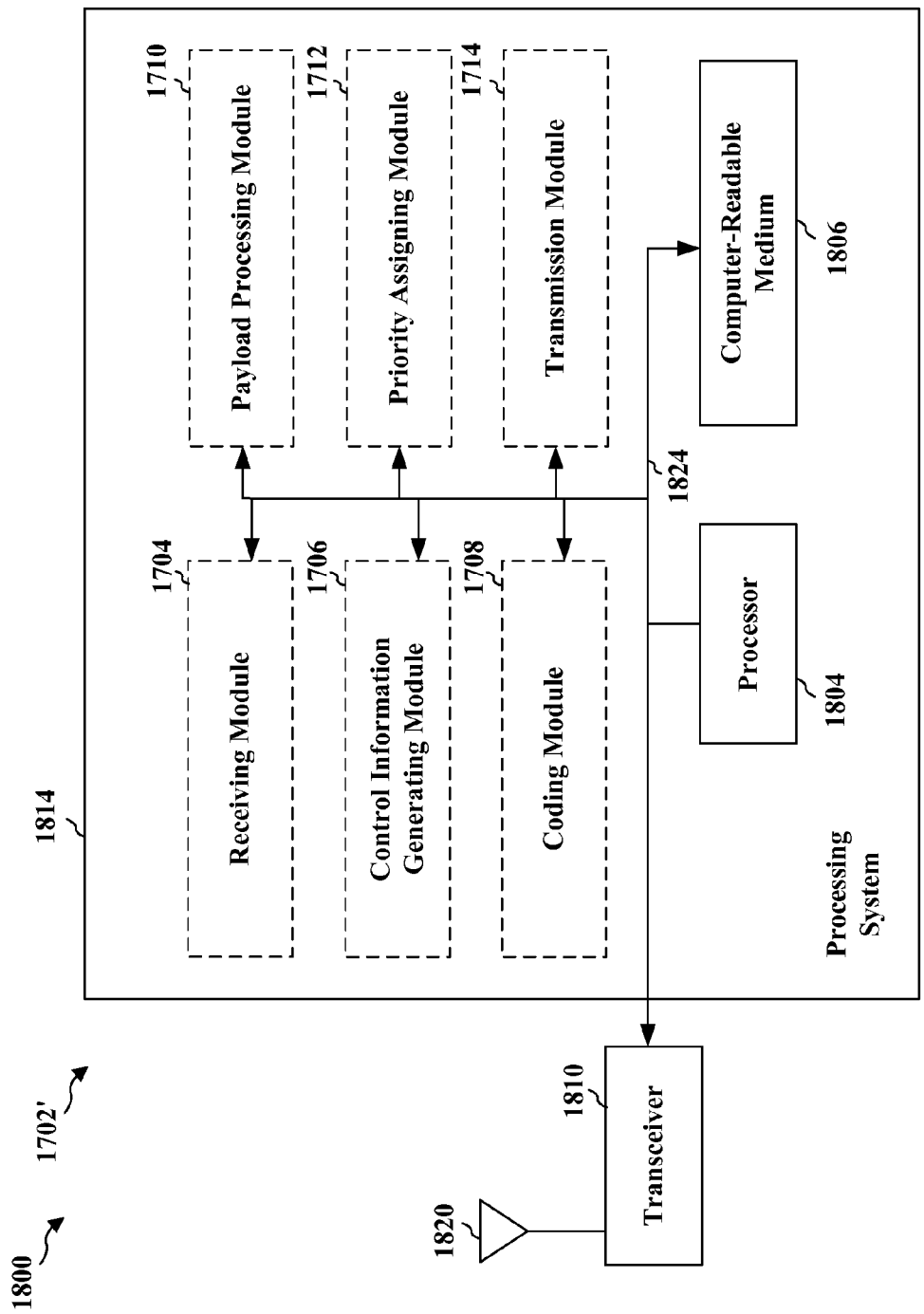
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, 1712, 1714, and the computer-readable medium 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the receiving module 1704. In addition, the transceiver 1810 receives information from the processing system 1814, specifically the transmission module 1714, and based on the received information, generates a signal to be applied to the one or more antennas 1820. The processing system 1814 includes a processor 1804 coupled to a computer-readable medium 1806. The processor 1804 is responsible for general processing, including the execution of software stored on the computer-readable medium 1806. The software, when executed by the processor 1804, causes the processing system 1814 to perform the various functions described supra for any particular apparatus. The computer-readable medium 1806 may also be used for storing data that is manipulated by the processor 1804 when executing software. The processing system further includes at least one of the modules 1704, 1706, 1708, 1710, 1712, and 1714. The modules may be software modules running in the processor 1804, resident/stored in the computer readable medium 1806, one or more hardware modules coupled to the processor 1804, or some combination thereof. The processing system 1814 may be a component of the eNB 610 and may include the memory 676 and/or at least one of the TX processor 616, the RX processor 670, and the controller/processor 675.

In one configuration, the apparatus 1702/1702' for wireless communication includes means for generating first control information for transmitting in a first search space, means for coding the first control information, wherein the coding applied to the first control information is specific to the first search space and different from coding applied to second control information in a second search space, means for transmitting the coded first control information in the first search space, means for informing a user equipment (UE) of the coding applied to the first control information specific to the first search space, means for generating control information for transmitting in a first search space, means for determining a size of a first payload including the generated control information to be transmitted in the first search space, means for adjusting the size of the first payload to be different from a second payload transmitted in a second search space, means for transmitting the first payload having the adjusted size in the first search space, means for informing a user equipment (UE) of the adjusted size of the first payload to be transmitted in the first search space, means for generating first control information for transmitting in a first search space, for a first subset of subframes, means for assigning a first priority to the first control information to be transmitted in the first search space, the first priority higher than a second priority assigned to second control information transmitted in a second search space, and means for transmitting the first control information with the assigned first priority in the first search space, for a second subset of subframes, means for assigning a third priority to the first control information to be transmitted in the first search space, the third priority lower than a fourth priority assigned to the second control information transmitted in the second search space, and means for transmitting the first control information with the assigned third priority in the first search space.

The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 19:
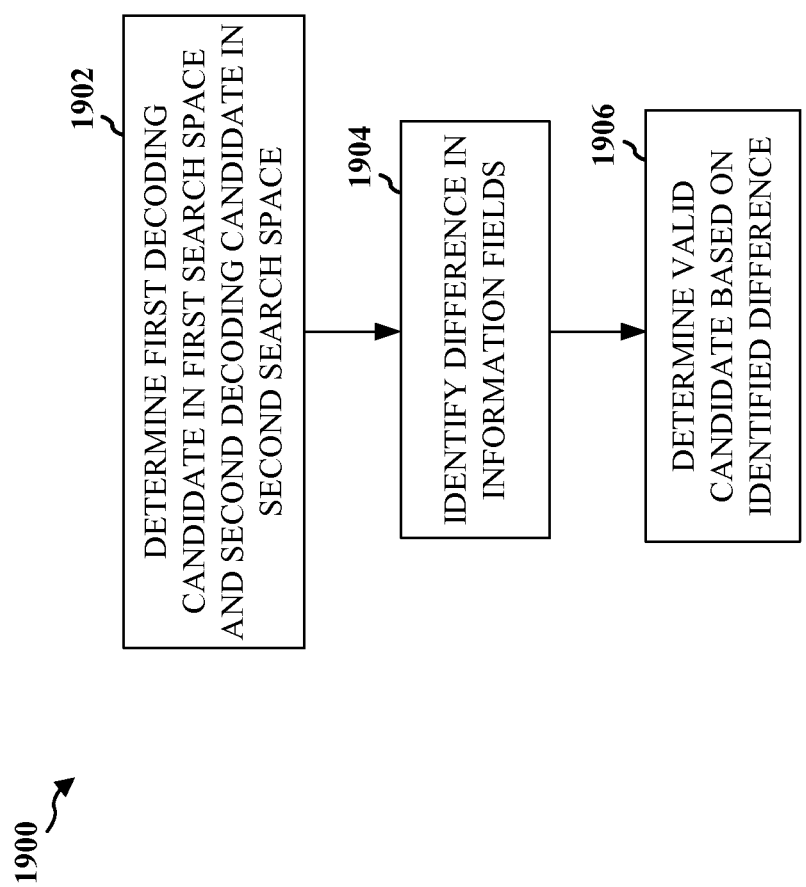
FIG. 19 is a flow chart of a method of wireless communication.

FIG. 19 is a flow chart 1900 of a method of wireless communication. The method may be performed by an apparatus. At step 1902, the apparatus determines a first decoding candidate (e.g., first PDCCH candidate) in a first search space and a second decoding candidate (e.g., second PDCCH candidate) in a second search space. The first decoding candidate and the second decoding candidate may have a same size but different definitions of information fields. The first search space may be a common search space (CSS) and the second search space may be a user equipment specific search space (UESS). Moreover, the first decoding candidate and the second decoding candidate may have a same starting control channel element (CCE).

At step 1904, the apparatus identifies a difference in the information fields. At step 1906, the apparatus determines one of the first decoding candidate and the second decoding candidate as a valid candidate based on the identified difference.

In an aspect, the difference in the information fields may be realized at the beginning of a downlink control information (DCI) message. Accordingly, the apparatus may determine that the first decoding candidate is the valid candidate when the difference occurs at the beginning of the DCI message. A distinct information field in the DCI message may be a cross-carrier indicator field (CIF).

In another aspect, the difference in the information fields may be realized towards the end of the DCI message. Accordingly, the apparatus may determine that the second decoding candidate is the valid candidate when the difference occurs towards the end of the DCI message. A distinct information field in the DCI message may include at least one of a channel state information (CSI) request field or a sounding reference signal (SRS) request field.

Figure 20:
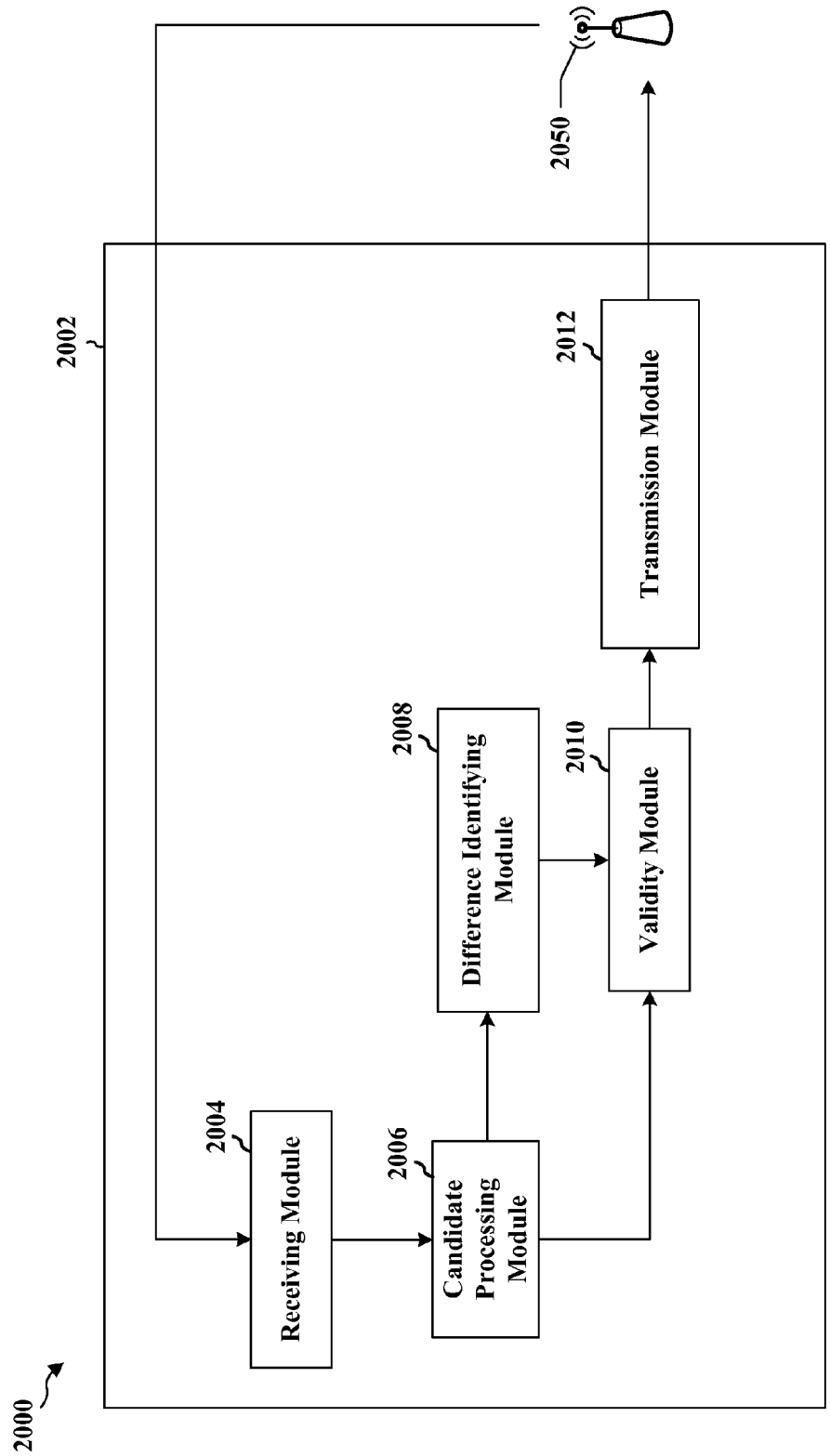
FIG. 20 is a conceptual data flow diagram illustrating the data flow between different modules/means/components in an exemplary apparatus.

FIG. 20 is a conceptual data flow diagram 2000 illustrating the data flow between different modules/means/components in an exemplary apparatus 2002. The apparatus includes a receiving module 2004, a candidate processing module 1206, a difference identifying module 2008, a validity module 2010, and a transmission module 1212.

The candidate processing module 2006 may receive information from a base station 2050 via the receiving module 2004. The candidate processing module 2006 determines a first decoding candidate (e.g., first PDCCH candidate) in a first search space and a second decoding candidate (e.g., second PDCCH candidate) in a second search space. The first decoding candidate and the second decoding candidate may have a same size but different definitions of information fields. The first search space may be a common search space (CSS) and the second search space may be a user equipment specific search space (UESS). Moreover, the first decoding candidate and the second decoding candidate may have a same starting control channel element (CCE).

The difference identifying module 2008 identifies a difference in the information fields. The validity module 2010 determines one of the first decoding candidate and the second decoding candidate as a valid candidate based on the identified difference.

In an aspect, the difference identifying module 2008 realizes a difference in the information fields at the beginning of a downlink control information (DCI) message. Accordingly, the validity module 2010 may determine that the first decoding candidate is the valid candidate when the difference occurs at the beginning of the DCI message. A distinct information field in the DCI message may be a cross-carrier indicator field (CIF).

In another aspect, the difference identifying module 2008 realizes the difference in the information fields towards the end of the DCI message. Accordingly, the validity module 2010 may determine that the second decoding candidate is the valid candidate when the difference occurs towards the end of the DCI message. A distinct information field in the DCI message may include at least one of a channel state information (CSI) request field or a sounding reference signal (SRS) request field.

The apparatus may include additional modules that perform each of the steps of the algorithm in the aforementioned flow chart of FIG. 19. As such, each step in the aforementioned flow chart of FIG. 19 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
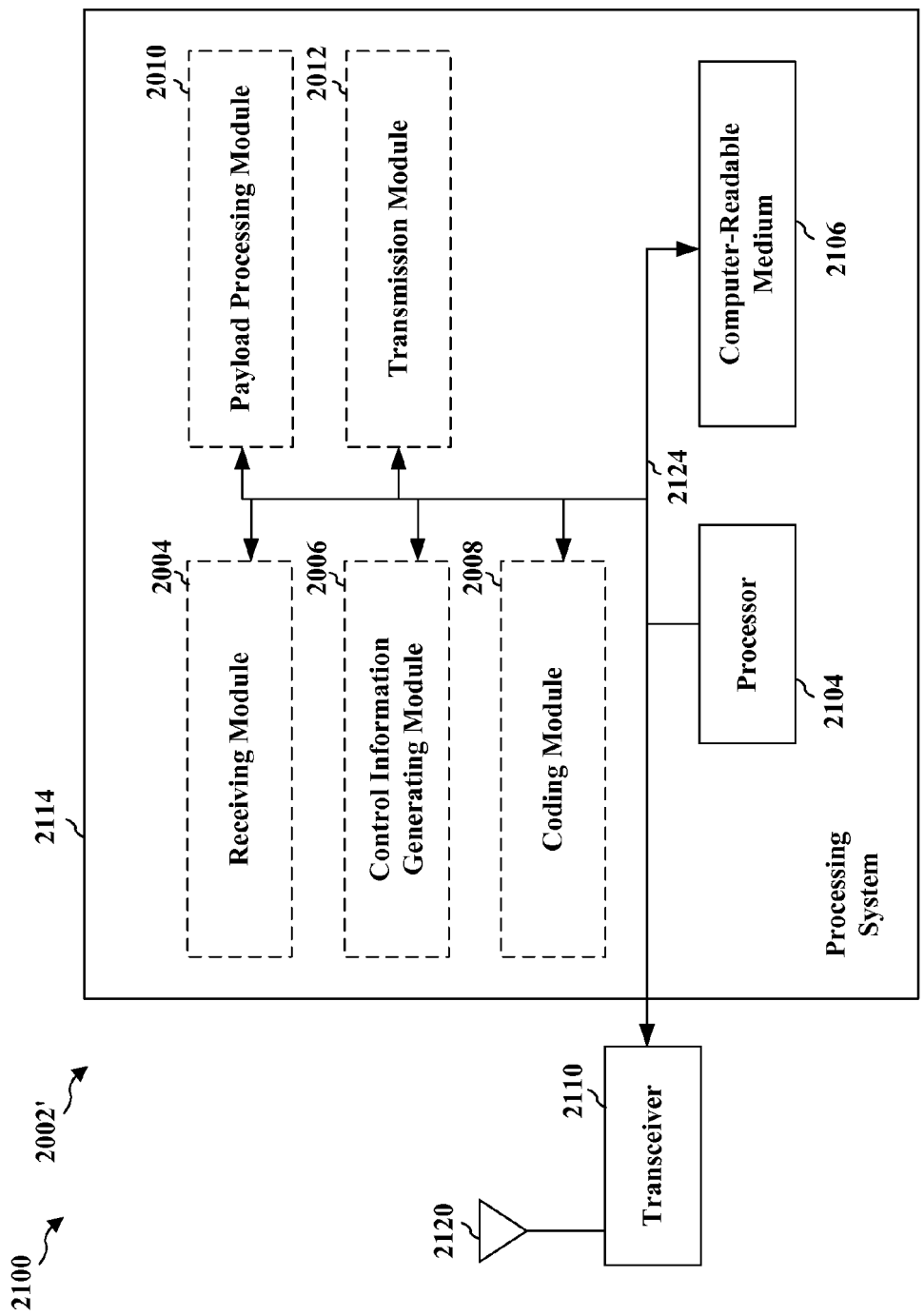
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 2004, 2006, 2008, 2010, 2012, and the computer-readable medium 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the receiving module 2004. In addition, the transceiver 2110 receives information from the processing system 2114, specifically the transmission module 2012, and based on the received information, generates a signal to be applied to the one or more antennas 2120. The processing system 2114 includes a processor 2104 coupled to a computer-readable medium 2106. The processor 2104 is responsible for general processing, including the execution of software stored on the computer-readable medium 2106. The software, when executed by the processor 2104, causes the processing system 2114 to perform the various functions described supra for any particular apparatus. The computer-readable medium 2106 may also be used for storing data that is manipulated by the processor 2104 when executing software. The processing system further includes at least one of the modules 2004, 2006, 2008, 2010, and 2012. The modules may be software modules running in the processor 2104, resident/stored in the computer readable medium 2106, one or more hardware modules coupled to the processor 2104, or some combination thereof. The processing system 2114 may be a component of the eNB 610 and may include the memory 676 and/or at least one of the TX processor 616, the RX processor 670, and the controller/processor 675. The processing system 2114 may also be a component of the UE 650 and may include the memory 660 and/or at least one of the TX processor 668, the RX processor 656, and the controller/processor 659.

In one configuration, the apparatus 2002/2002' for wireless communication includes means for determining a first decoding candidate in a first search space and a second decoding candidate in a second search space, where the first decoding candidate and the second decoding candidate have a same size but different definitions of information fields, means for identifying a difference in the information fields, means for determining one of the first decoding candidate and the second decoding candidate as a valid candidate based on the identified difference, means for determining the first decoding candidate as the valid candidate, and means for determining the second decoding candidate as the valid candidate.

The aforementioned means may be one or more of the aforementioned modules of the apparatus 2002 and/or the processing system 2114 of the apparatus 2002' configured to perform the functions recited by the aforementioned means. As described supra, the processing system 2114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means. The processing system 2114 may also include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    determining a first starting index for transmitting a first control message in a first search space;
    determining a second starting index for transmitting a second control message in a second search space; and
    when the first starting index and the second starting index have the same value:
        determining at least one information field different between the first control message and the second control message,
        determining whether the at least one different information field in the second control message would have a different interpretation when decoded based on the first search space than when decoded based on the second search space, and
        setting a bit of the at least one different information field to zero in the second control message when the at least one information field in the second control message would have a different interpretation when decoded based on the first search space than when decoded based on the second search space.

2. The method of claim 1, wherein the first search space is a common search space (CSS) and the second search space is a user equipment specific search space (UESS).

3. The method of claim 1, wherein the first search space is a user equipment specific search space (UESS) and the second search space is a common search space (CSS).

4. The method of claim 1, further comprising transmitting the second control message in the second search space at the second starting index.

5. The method of claim 1, wherein the information field comprises an aperiodic channel state information (CSI) triggering field, an aperiodic sounding reference signal (SRS) triggering field, or a multi-cluster assignment flag field.

6. An apparatus for wireless communication, comprising:
means for determining a first starting index for transmitting a first control message in a first search space;
means for determining a second starting index for transmitting a second control message in a second search space; and
when the first starting index and the second starting index have the same value:
means for determining at least one information field different between the first control message and the second control message,
means for determining whether the at least one different information field in the second control message would have a different interpretation when decoded based on the first search space than when decoded based on the second search space, and
means for setting a bit of the at least one different information field to zero in the second control message when the at least one information field in the second control message would have a different interpretation when decoded based on the first search space than when decoded based on the second search space.

7. The apparatus of claim 6, further comprising means for transmitting the second control message in the second search space at the second starting index.

8. The apparatus of claim 6, wherein the first search space is a common search space (CSS) and the second search space is a user equipment specific search space (UESS).

9. The apparatus of claim 6, wherein the first search space is a user equipment specific search space (UESS) and the second search space is a common search space (CSS).

10. The apparatus of claim 6, wherein the information field comprises an aperiodic channel state information (CSI) triggering field, an aperiodic sounding reference signal (SRS) triggering field, or a multi-cluster assignment flag field.

11. An apparatus for wireless communication, comprising:
a memory; and
at least one processor coupled to the memory and configured to:
determine a first starting index for transmitting a first control message in a first search space;
determine a second starting index for transmitting a second control message in a second search space; and
when the first starting index and the second starting index have the same value:
determine at least one information field having a respective bit different between the first control message and the second control message,
determine whether the at least one different information field in the second control message would have a different interpretation when decoded based on the first search space than when decoded based on the second search space, and
set a bit of the at least one different information field to zero in the second control message when the at least one information field in the second control message would have a different interpretation when decoded based on the first search space than when decoded based on the second search space.

12. The apparatus of claim 11, the at least one processor further configured to transmit the second control message in the second search space at the second starting index.

13. The apparatus of claim 11, wherein the first search space is a common search space (CSS) and the second search space is a user equipment specific search space (UESS).

14. The apparatus of claim 11, wherein the first search space is a user equipment specific search space (UESS) and the second search space is a common search space (CSS).

15. The apparatus of claim 11, wherein the information field comprises an aperiodic channel state information (CSI) triggering field, an aperiodic sounding reference signal (SRS) triggering field, or a multi-cluster assignment flag field.

16. A non-transitory computer-readable medium storing computer executable code, comprising code for:
determining a first starting index for transmitting a first control message in a first search space;
determining a second starting index for transmitting a second control message in a second search space; and
when the first starting index and the second starting index have the same value:
determining at least one information field having a respective bit different between the first control message and the second control message,
determining whether the at least one different information field in the second control message would have a different interpretation when decoded based on the first search space than when decoded based on the second search space, and
setting a bit of the at least one different information field to zero in the second control message when the at least one information field in the second control message would have a different interpretation when decoded based on the first search space than when decoded based on the second search space.

17. The non-transitory computer-readable medium of claim 16, the non-transitory computer-readable medium further comprising code for transmitting the second control message in the second search space at the second starting index.

18. The non-transitory computer-readable medium of claim 16, wherein the first search space is a common search space (CSS) and the second search space is a user equipment specific search space (UESS).

19. The non-transitory computer-readable medium of claim 16, wherein the first search space is a user equipment specific search space (UESS) and the second search space is a common search space (CSS).

20. The non-transitory computer-readable medium of claim 16, wherein the information field comprises an aperiodic channel state information (CSI) triggering field, an aperiodic sounding reference signal (SRS) triggering field, or a multi-cluster assignment flag field.

* * * * *